United States Patent
Takakura et al.

(10) Patent No.: US 7,077,323 B2
(45) Date of Patent: Jul. 18, 2006

(54) BAR CODE RECOGNIZING METHOD AND DECODING APPARATUS FOR BAR CODE RECOGNITION

(75) Inventors: Hiroyuki Takakura, Kawasaki (JP); Hirotaka Chiba, Kawasaki (JP); Nobuyasu Yamaguchi, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 202 days.

(21) Appl. No.: 10/681,150

(22) Filed: Oct. 9, 2003

(65) Prior Publication Data
US 2004/0074967 A1 Apr. 22, 2004

(30) Foreign Application Priority Data
Oct. 10, 2002 (JP) .............................. 2002-298074
Nov. 29, 2002 (JP) .............................. 2002-347745

(51) Int. Cl.
*G02B 26/10* (2006.01)
(52) U.S. Cl. .............................. 235/462.25; 235/462.07
(58) Field of Classification Search ........... 235/462.01, 235/462.07, 462.15, 462.16, 462.18, 462.25, 235/494
See application file for complete search history.

(56) References Cited

U.S. PATENT DOCUMENTS

| 4,095,096 A | * | 6/1978 | Harada et al. ......... 235/462.18 |
| 4,450,349 A | * | 5/1984 | Apitz et al. ............. 235/462.18 |
| 4,992,650 A | * | 2/1991 | Somerville ............... 235/462.1 |
| 5,393,968 A | * | 2/1995 | Watanabe et al. ...... 235/462.29 |
| 5,504,320 A | * | 4/1996 | Adachi .................. 235/462.18 |
| 5,539,191 A | * | 7/1996 | Ackley .................. 235/462.26 |
| 5,602,382 A | * | 2/1997 | Ulvr et al. ............. 235/462.02 |
| 5,767,497 A | * | 6/1998 | Lei ........................ 235/462.12 |
| 5,877,486 A | * | 3/1999 | Maltsev et al. ........ 235/462.15 |
| 6,279,828 B1 | * | 8/2001 | Fann ..................... 235/462.01 |
| 6,508,405 B1 | * | 1/2003 | Tang et al. ............. 235/462.25 |

FOREIGN PATENT DOCUMENTS

| JP | 01290091 A | * 11/1989 |
| JP | 2000-353211 | 12/2000 |
| JP | 2001-184481 | 7/2001 |

\* cited by examiner

*Primary Examiner*—Michael G. Lee
*Assistant Examiner*—Kumiko C. Koyama
(74) *Attorney, Agent, or Firm*—Staas & Halsey LLP

(57) ABSTRACT

A bar code is scanned and a line of image data is extracted in a process. The line of extracted image is divided into patterns forming characters in a process. The divided patterns are converted into characters in a process. In the process, a pattern is divided by the number of modules having the smallest width forming a black bar or a white bar, a module value indicating each module as black or white is determined, and each pattern is converted into a character, thereby correctly recognizing a bar code using general-purpose optical equipment for reading a bar code.

27 Claims, 21 Drawing Sheets

READ RESOLUTION OF OPTICAL EQUIPMENT

RESOLUTION OF BAR CODE

CONVERTED BINARY DATA OR PULSE WAVE

POSITION OR TIME

RATIO OF 2:4
(SOLUTION IS 1:3)

BAR WIDTH OBTAINED FROM BINARY DATA OR PULSE WAVE

AREA ABOVE THRESHOLD (=0) <
AREA BELOW THRESHOLD

MODULE → BLACK (A) SIXTH MODULE

AREA ABOVE THRESHOLD >
AREA BELOW THRESHOLD

MODULE → WHITE (B) SEVENTH MODULE

BAR CODE RECOGNIZING METHOD AND DECODING APPARATUS FOR BAR CODE RECOGNITION

BACKGROUND OF THE INVENTION

The present invention relates to a bar code recognition system, and more specifically to a bar code recognizing method and a decoding apparatus for bar code recognition for recognizing a bar code image read by general-purpose optical equipment such as a scanner, a CCD camera, etc. independent of the type of optical equipment and without lowering reading precision.

DESCRIPTION OF THE RELATED ART

FIG. 1A is a flowchart of the processes in the reading method for use with a commonly distributed bar code reading device. In FIG. 1A, an image is read first in step S101, the read image is converted into an electric signal in the photoelectric converting process in step S102, and the signal is converted into a digital signal in the A/D converting process in step S103.

In the bar code area extracting process in step S104, a bar code area normally provided between margins (also referred to as quiet zones) as space areas is extracted. In the decoding process in step S105, the area is converted into a character, a symbol, etc. In the bar code information outputting process in step S106, for example, the result is outputted to the display.

FIG. 1B is a block diagram of the first example of the configuration of the bar code reading device according to the conventional technology. The units from an image reading unit 51 through a bar code information output unit 56 corresponding to the respective step shown in FIG. 1A are contained in one device.

FIG. 1C is a block diagram of the second example of the configuration of the bar code reading device according to the conventional technology. The units from the image reading unit 51 through a decoding unit 55 are contained in one device, and a decoding process result is displayed by the bar code information output unit 56 as a display of, for example, a personal computer (PC).

In these bar code reading devices according to the conventional technology, a decoding process is performed based on the feature of optical equipment. A device whose optical equipment and decoding portion is separate and a decoding device which allows general purpose optical equipment to read bar codes are not used in the conventional technology.

The conventional bar code reading device and a reading method are disclosed, for example, in the following patent literature.

Japanese Patent Application Laid-open No.2001-184481 "Image Reading Apparatus and Image Reading method"

Japanese Patent Application Laid-open No.2000-353211 "Bar Code Recognition Apparatus and Bar Code Recognizing Method"

The Japanese Patent Application Laid-open No.2001-184481 has disclosed an image reading method capable of segmenting an image of a signature, an imprint, etc. together with a bar code without providing a specific segmentation symbol when a signature, an imprint, etc. exist near a bar code image.

The Japanese Patent Application Laid-open No. 2000-353211 has disclosed a bar code recognition apparatus capable of correctly recognizing the contents of a bar code when the thicknesses of the bars on the left and right areas of the central bar are differently captured for any reason.

In the above-mentioned conventional technology, a bar code image input from optical equipment is treated in a binarizing process based on a predetermined threshold, the widths of a black bar (having low reflectance in the parallel bars, and also referred to as a bar) and a white bar (having high reflectance, and also referred to as a space) of a bar code are computed from the obtained binary data, and the type of bar is determined depending on whether or not the widths of the bars are in a predetermined range, thereby performing the decoding process.

That is, in the conventional technology, the pulse width corresponding to the black bar or the white bar on the right of the left guard bar is measured from the pulse waveform corresponding to the binarizing process, based on the pulse width corresponding to the left guard bar (start bar) directly on the right of the left margin of the bar code, the type of bar is sequentially determined depending on whether or not the pulse width is in a predetermined range, thereby sequentially decoding a read bar code.

For example, when a bar code is read using general-purpose optical equipment such as a camera, etc. to be attached to a mobile phone, the read resolution is lowered when the distance between the optical equipment and the bar code is long, and the bar code cannot be correctly recognized.

When a conventional decoding method is used, the data read by optical equipment is converted into pulse data or binary data, and then the width of the bar of the bar code is obtained depending on whether the value of the binary data in an arbitrary position of the bar code is 0 or 1. Therefore, when the read resolution is low, the read result of the bar width is not correct, and a correct recognizing process cannot be performed.

FIG. 1D shows the above-mentioned problems. In FIG. 1D, the bar code read result is converted into binary data or a pulse waveform, and the determination as to whether it is a black bar or a white bar is made depending on the data of 0 or 1. The binary data corresponds to, for example, the brightness. That is, 1 indicates white, and 0 indicates black.

In the binary data, the first "1" on the left indicates white corresponding to the left margin of the bar code. The "0s" for the two subsequent sections indicate black, and the "1" for the next section indicates white. In the drawings in which the widths of bars are obtained from binary data, the data corresponding to these three sections except the margin does not express the upper left black bar and white bar as having equal widths, thereby failing in correctly reading the bar code.

In the binary data, the two subsequent sections indicating black and the next four sections indicating white respectively correspond to the black bar having the width of 1 and the white bar having the width of 3 in the upper bar code. This indicates that the recognition result is not correct on these portions.

When a bar code is read using general-purpose optical equipment such as a CCD camera, etc., the distortion of an input image occurs by optical distortion. Additionally, if the read direction of the optical equipment is tilted relative to the plane of the bar code, or the bar code is written on the surface of the cylindrical side of a cylinder, a can, etc. when the bar code is read, then there occurs distortion in the read bar code data. In the conventional method, the data read from optical equipment is first converted into binary data or pulse data, and then the width of a bar of the bar code is obtained. Therefore, distortion occurs on the data, the length (width) of a bar is incorrect, and a recognizing process cannot be correctly performed.

SUMMARY OF THE INVENTION

The present invention aims at providing a bar code recognizing method capable of correctly reading a bar code without lowering reading precision based on a bar code reading device obtained by combining general-purpose optical equipment with a bar code decoding device such as a personal computer although distortion occurs on input data regardless of the type of optical equipment.

To attain the above-mentioned object, the bar code recognizing method according to the present invention which reads a bar code using optical equipment includes: an image extracting process of extracting a line of image data by scanning a bar code; a character area dividing process of dividing the line of the extracted image into patterns forming characters; and a pattern converting process of converting the divided patterns into characters.

To attain the above-mentioned object, the decoding apparatus for bar code recognition according to the present invention for recognizing bar code data read by optical equipment includes: an image extraction unit for extracting a line of image data by scanning a read result of a bar code by the optical equipment; a character area division unit for dividing the line of the extracted image into patterns forming characters; and a pattern conversion unit for converting the divided patterns into characters.

Furthermore, to attain the above-mentioned object, the computer-readable storage medium according to the present invention used by a computer which performs a recognizing process on bar code data read by optical equipment stores a program used to direct the computer to perform: a step of extracting a line of image data by scanning a read result of a bar code by the optical equipment; a step of dividing the line of the extracted image into patterns forming characters; and a step of converting the divided patterns into characters.

DESCRIPTION OF THE PREFERRED EMBODIMENTS

The bar code recognizing method according to the present invention, that is, the bar code recognizing method of reading a bar code using optical equipment, comprises at least an image extracting process, a character area dividing process, and a pattern converting process.

The image extracting process extracts a line of image data by scanning a bar code. The character area dividing process divides the line of the extracted image into patterns forming characters. The pattern converting process converts the divided patterns into characters.

Figure 1A:
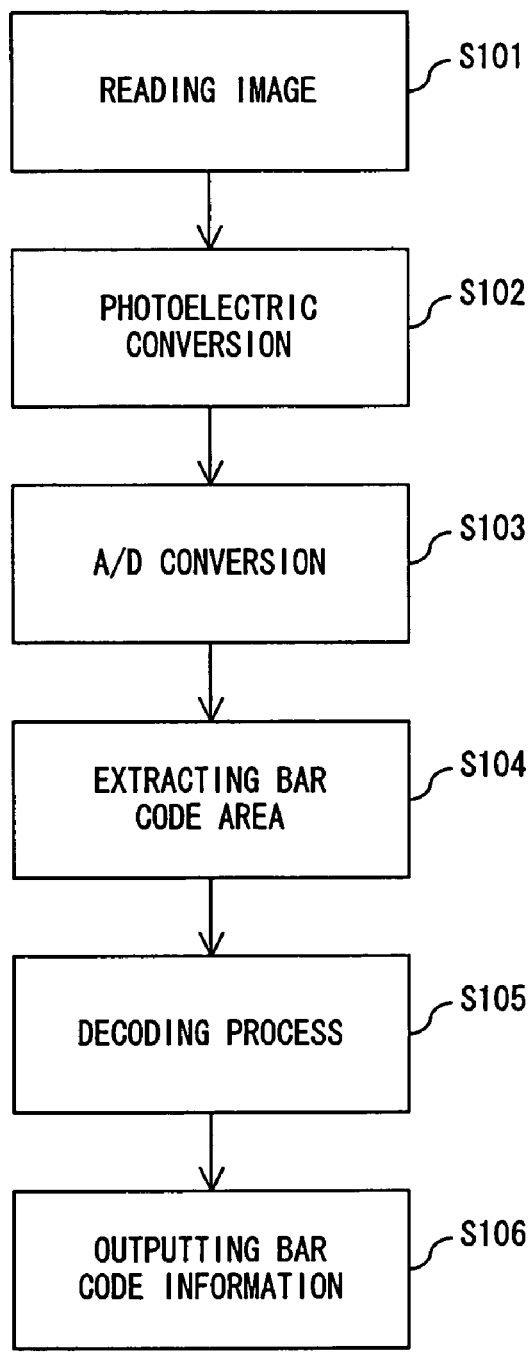
FIG. 1A shows an example of the conventional technology of a bar code decoding process.
Figure 1B:
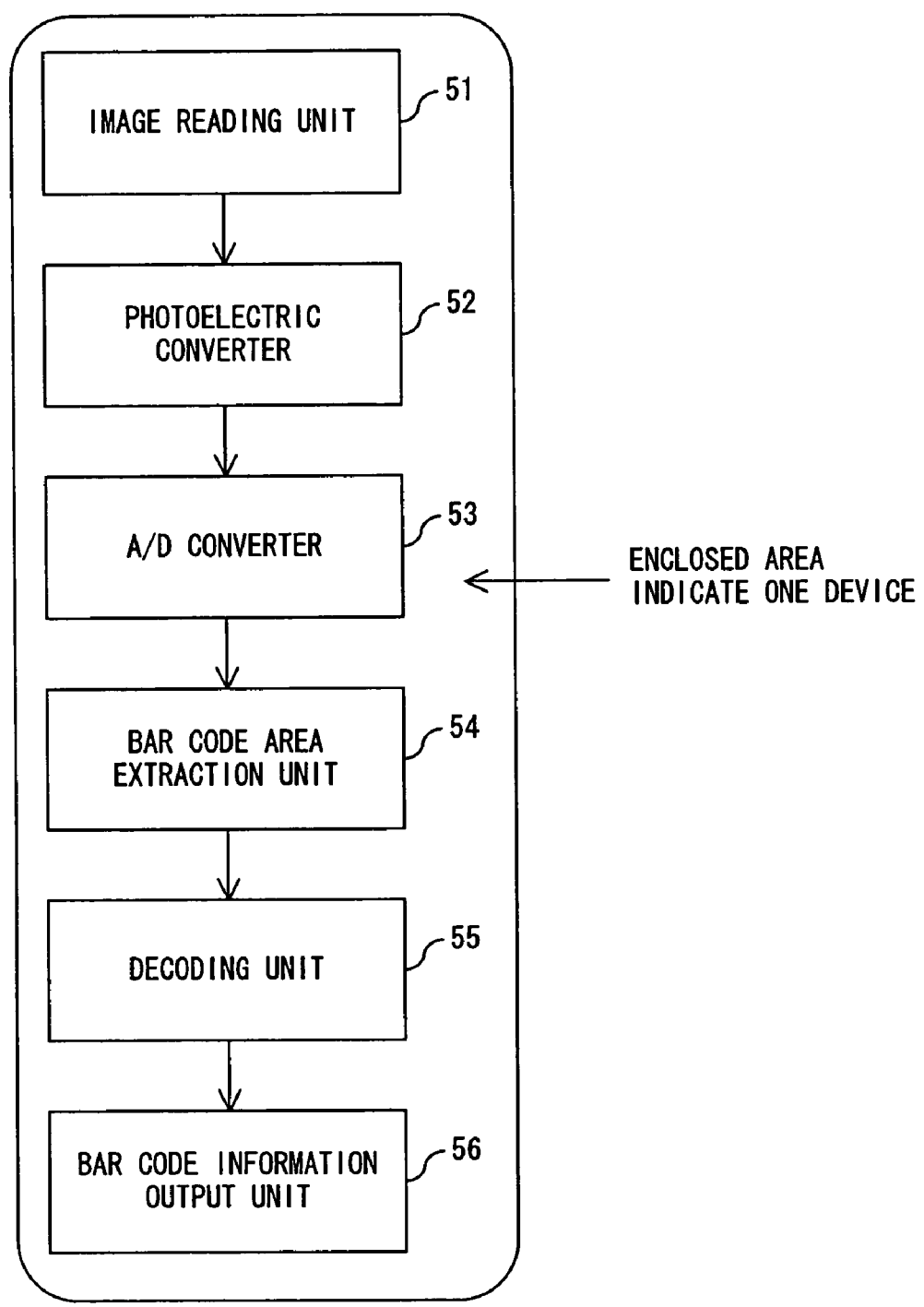
FIG. 1B is a block diagram of the configuration according to the first conventional technology of a bar code decoding device.
Figure 1C:
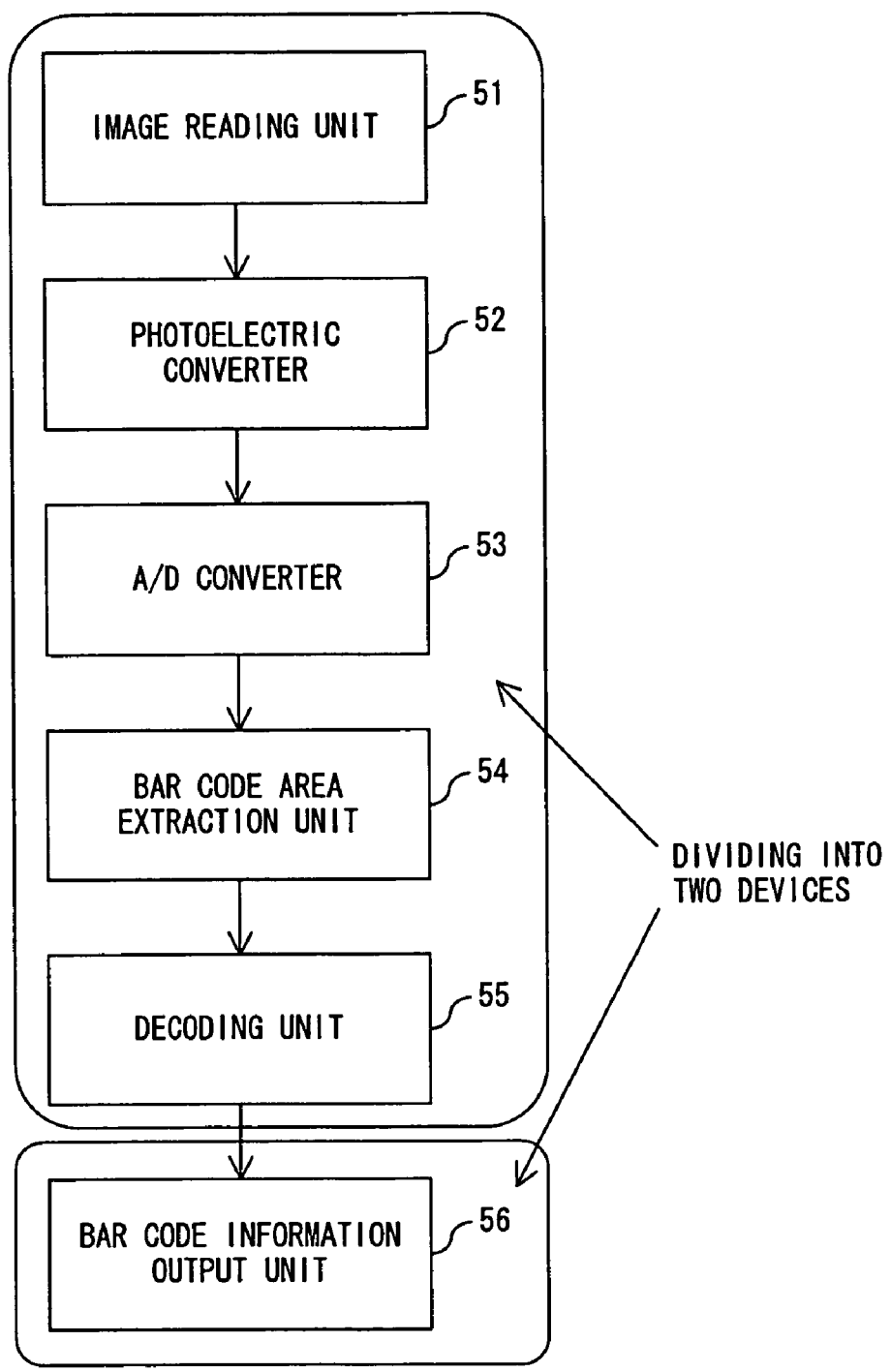
FIG. 1C is a block diagram of the configuration according to the second conventional technology of a bar code decoding device.
Figure 1D:
FIG. 1D is an explanatory view of the problem according to the conventional bar code decoding method.
Figure 1D:
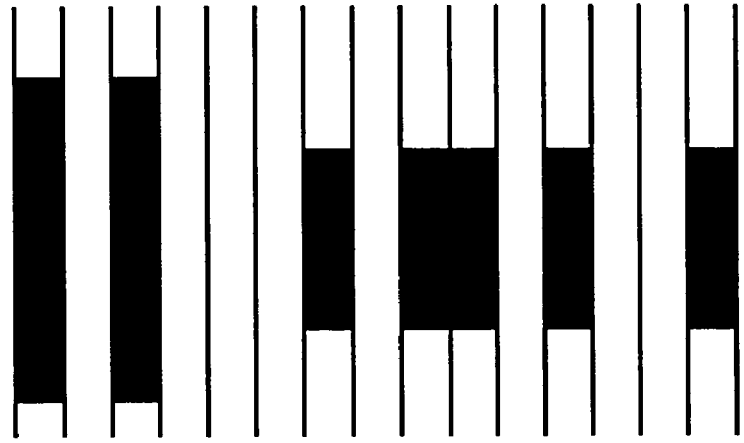
Figure 1D:
Figure 1D:
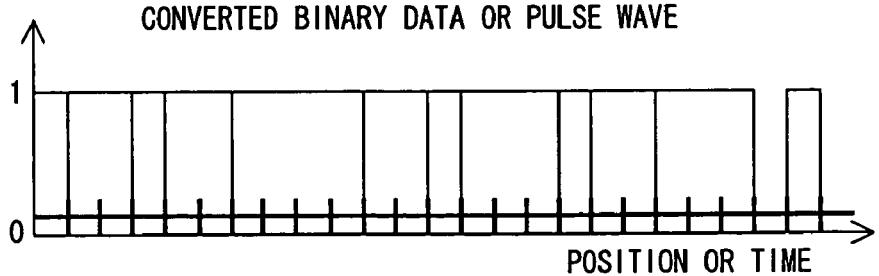
Figure 1D:
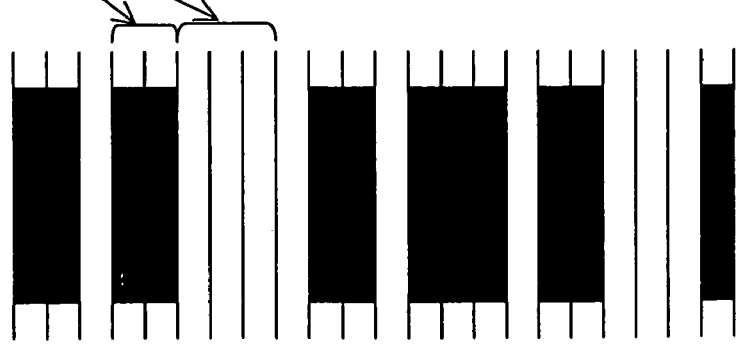
Figure 1E:
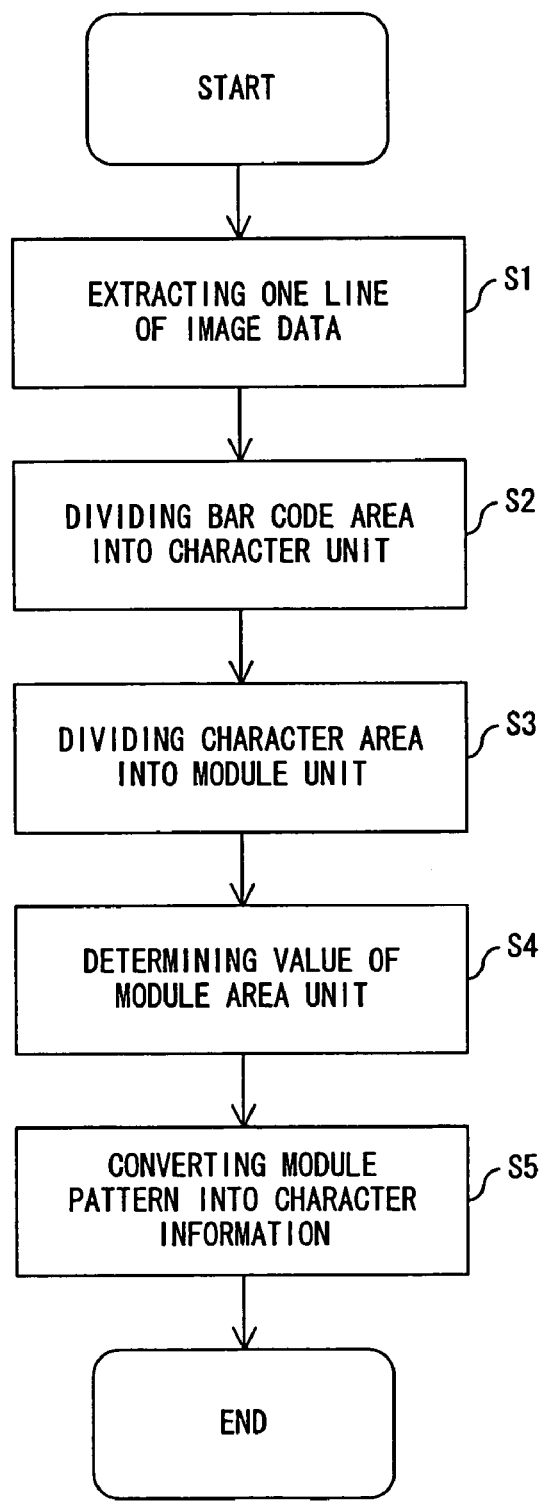
FIG. 1E is an explanatory view of the process of the bar code recognizing method according to the present invention.

FIG. 1E is an explanatory view of the process of the bar code recognizing method according to the present invention. The process in step S1 corresponds to the image extracting process, and the process in step S2 corresponds to the character area dividing process.

The processes in steps S3 through S5 correspond to the pattern converting process which comprises a module area dividing process corresponding to the process in step S3, a module value determining process corresponding to the process in step S4, and a module data converting process corresponding to the process in step S5.

In the module area dividing process in step S3, the pattern divided in the character area dividing process is divided by the number of modules having a width of the smallest unit forming a black bar or a white bar of a bar code. In the module value determining process in step S4, it is determined which value corresponding to a black bar or a white bar the divided modules have. In the module data converting process corresponding to step S5, the patterns formed by modules are converted in to characters.

The bar code recognizing method according to an embodiment of the present invention can further comprise: an image data converting process of converting data into gray scale image data having a single color element when a line of image data extracted in the image extracting process is multi-valued image data having a plurality of color elements, and providing the resultant data for a character area dividing process; and an image data complementing process of complementing deficient data in the line of the extracted image data and providing the resultant data for the character area dividing process.

In the embodiment of the present invention, the character area dividing process can further comprise a bar number detecting process of detecting a total number of black bars and white bars contained in a bar code, a character number detecting process of detecting the number of characters contained in a bar code corresponding to a total number of black bars and white bars, and a boundary determining process of determining the boundary of a pattern forming a character corresponding to the number of detected characters.

Furthermore, in the bar number detecting process, the total number of black bars and white bars can be detected corresponding to the number of inflection points in a curve indicating a line of image data, and the number of inflection points for which the difference between the peak value and the bottom value of a curve including the inflection points exceeds a predetermined value can be counted in the inflection points.

According to the embodiment of the present invention, a boundary of a pattern forming part of a character can be obtained from inflection points of a curve in the character area dividing process. In this case, a boundary can also be obtained from the inflection points for which the difference between the peak value and the bottom value exceeds a predetermined value.

The bar code recognizing method according to the embodiment of the present invention can further comprise a threshold computing process of computing a threshold for determination using a line of image data as to whether the module value is black or white so that a module can be determined in the module value determining process by comparing data of a pixel contained in each of the divided modules with a threshold.

In this case, the frequency distribution of the image data can be obtained using a line of image data in the threshold computing process, and an average value between two pieces of data respectively corresponding to a peak in the portion containing the largest data value in the frequency curve and a peak in the portion containing the smallest data value can be defined as a threshold, or a frequency curve can be divided into two areas by the median between the maximum value and the minimum value of the image data, and an average value between two pieces of data respectively corresponding to the largest peak in a large area of image data and the largest peak in a small area of image data can be defined as a threshold.

Furthermore, in the threshold computing process, a line of image data is divided into patterns forming characters, and a threshold can be computed for each pattern.

In the embodiment of the present invention, the character area dividing process can further comprise the threshold computing process so that the boundary of a pattern forming a character can be obtained from the intersection points between a curve indicating a line of image data and a computed threshold. In this case, in the threshold computing process, as described above, the average value between the data respectively corresponding to the peak in the portion containing the largest data value and the peak in the portion containing the smallest data value, or the average value between the data respectively corresponding to the largest peak in the large area of data and the largest peak in the small area of data can be defined as a threshold.

Then, the decoding apparatus for bar code recognition recognizes bar code data read by optical equipment, and comprises: an image extraction unit for extracting a line of image data by scanning a read result of a bar code by the optical equipment; a character area division unit for dividing the line of the extracted image into patterns forming characters; and a pattern conversion unit for converting the divided patterns into characters.

In this case, in the embodiment according to the present invention, the optical equipment can further comprise a medium detection unit for detecting a medium on which a bar code is printed so that the image extraction unit can extract a line of image data corresponding to the medium detection result. The medium detection unit can also be an optical switch for optically detecting a medium.

Furthermore, according to the present invention, a computer-readable storage medium is used by a computer which performs a recognizing process on bar code data stores a program used to direct the computer to perform: a step of extracting a line of image data by scanning a read result of a bar code by the optical equipment; a step of dividing the line of the extracted image into patterns forming characters; and a step of converting the divided patterns into characters.

As described above, according the recognizing method of the present invention, a line of image data is extracted by scanning a bar code, the line of the extracted image is divided into patterns forming characters, and the divided patterns are converted into characters.

Figure 2:
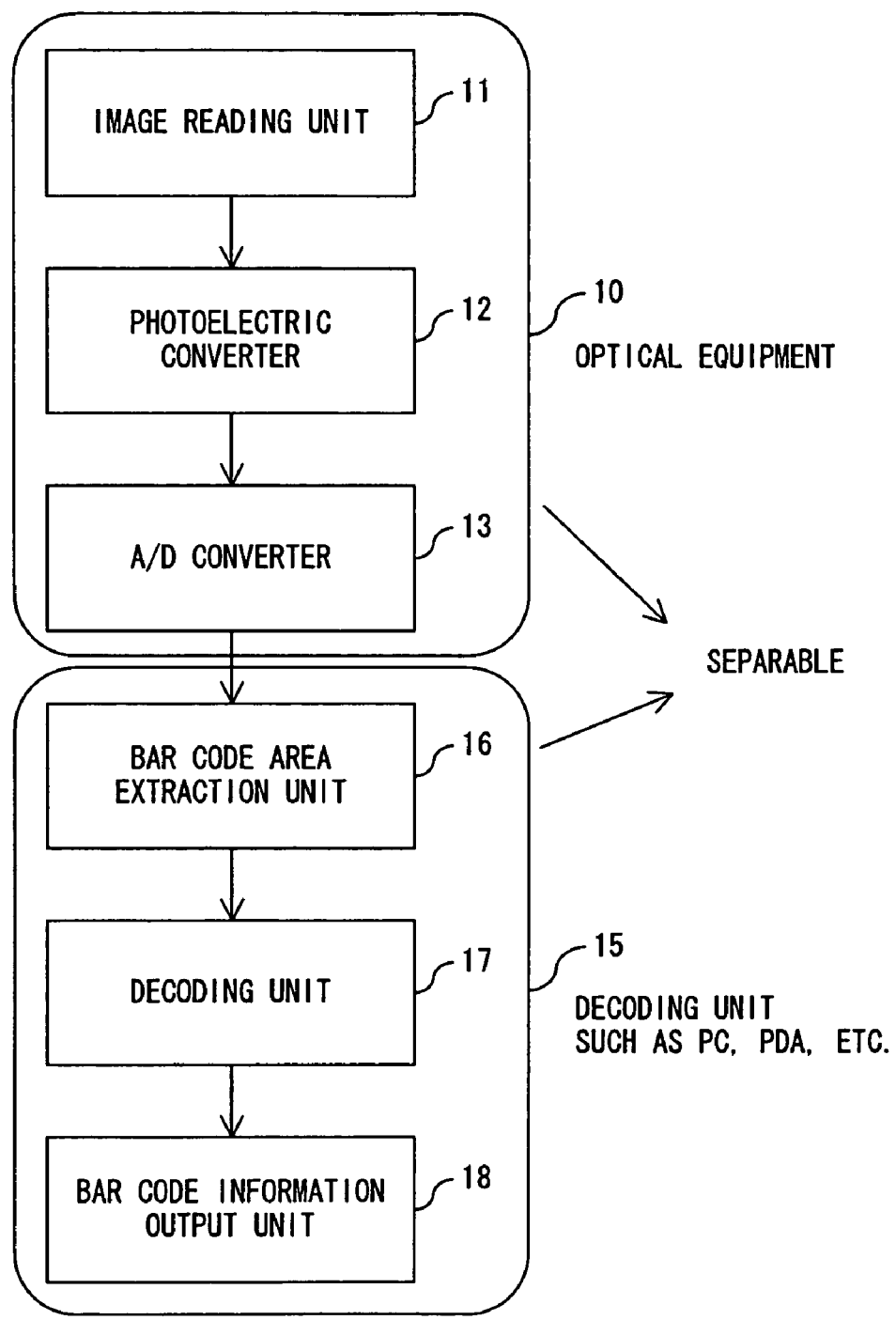
FIG. 2 is a block diagram showing the configuration of the bar code recognition apparatus according to an embodiment of the present invention.

FIG. 2 is a block diagram showing the configuration of an embodiment of the bar code recognition apparatus of the present invention. According to the present embodiment, for example, general-purpose optical equipment 10 such as a camera, etc. attached to a mobile phone is combined with a decoding unit 15 corresponding to a bar code decoding device such as a personal computer (PC), a personal digital assistant (PDA), etc., thereby configuring a bar code recognition apparatus.

Using general-purpose optical equipment, there may occur distortion in input data by the relative position between a bar code and the reading position of the optical equipment, or the function of adjusting the focus of the lens. However, by adding a device to the bar code recognizing method, an apparatus capable of reading and recognizing a bar code regardless of the type of optical equipment without lowering the reading precision can be provided.

In FIG. 2, the optical equipment 10 comprises an image reading unit 11, a photoelectric converter 12, and an A/D converter 13, and read image data is output as digital data.

The decoding unit 15 receives the digital image data from the optical equipment 10, and outputs a character, a number, or a symbol as a bar code recognition result, and comprises a bar code area extraction unit 16, a decoding unit 17, and a bar code information output unit 18.

Thus, according to the present embodiment, the image data obtained by the optical equipment 10 is processed by the decoding unit 15 such as a PC, PDA, etc. capable of implementing an application and outputting the contents after processing to a display, etc., thereby recognizing a bar code.

That is, by loading a decoding function into a PC or a PDA, it can be combined with general-purpose optical equipment, for example, a digital camera, a scanner, a laser scanner, etc. to read a bar code. For example, using a digital camera and a PDA in a CF (compact flash) format, the decoding function described later can be loaded into a PDA as an application, thereby successfully reading a bar code without exclusively providing decoding software.

Described below is an embodiment of the present invention in which the optical equipment 10 can be separated from the decoding unit 15 as shown in FIG. 2. It is obvious that the bar code recognizing method according to the present invention can be applied to conventional equipment exclusively used for reading a bar code. If the recognizing method according to the present invention is applied to such optical equipment, it can be expected that recognition information is furthermore improved.

Figure 3:
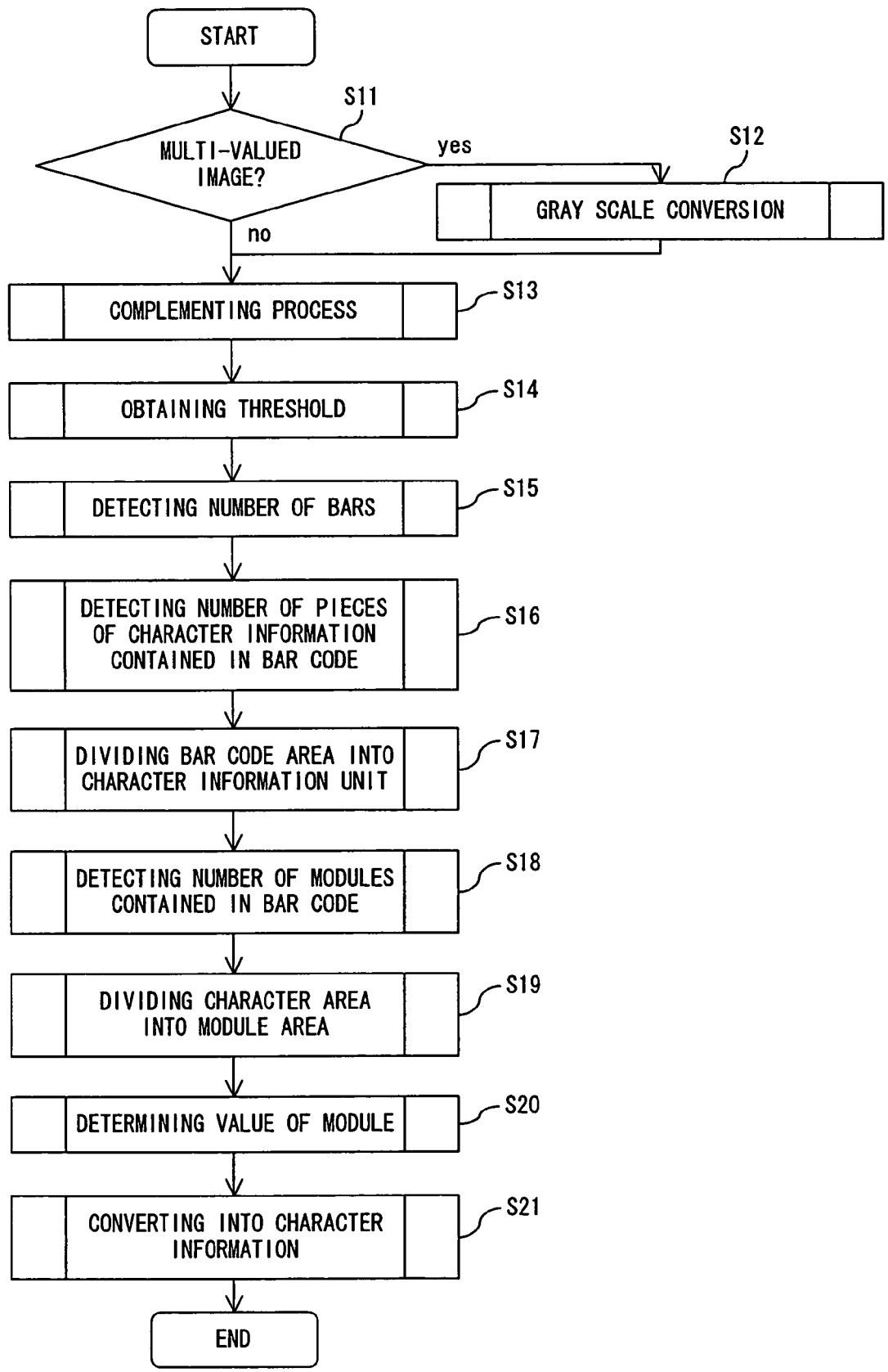
FIG. 3 is a flowchart of the bar code decoding process according to an embodiment of the present invention.

FIG. 3 is a flowchart of the decoding process according to the present embodiment. When the process is started as shown in FIG. 3, it is first determined in step S11 whether or not the image data obtained by the optical equipment is a multi-valued image having, for example, RGB color elements. If it is a multi-valued image, it is converted into a single gray scale image in step S12. The amount of data is reduced by converting the image into a single gray scale image, thereby simplifying the subsequent processes.

As a method of converting an image into a single gray scale image, an image having a differentiation value as a pixel element is generated using a difference filter, an image is generated using of RGB color elements, or other converting methods can be used. According to the present embodiment, YCbCr conversion corresponding to the component coding as a coding systems for color television, etc. is performed, and a gray scale image is generated by carefully checking the Y element in the brightness element Y, and the color difference element CbCr.

In this process, the process of obtaining an output value by adding up three color elements of RGB of an input image using a predetermined ratio is performed. Assume that an input image is represented by the following equation.

Image(x,y)=(R(x,y), G(x, y), B(x, y))

Then, an output image can be obtained by the following equation $f(x,y) = a_1 \times R(x, y) + a_2 \times G(x,y) + a_3 \times B(x,y)$ where R (x, y), G (x, y), and B (x, y) indicate color elements, and $a_1$, $a_2$, and $a_3$ indicate predetermined coefficients. In the present embodiment, these coefficients can be, for example, the following values.

$a_1 = 0.299$, $a_2 = 0.587$, $a_3 = 0.114$

Figure 4:
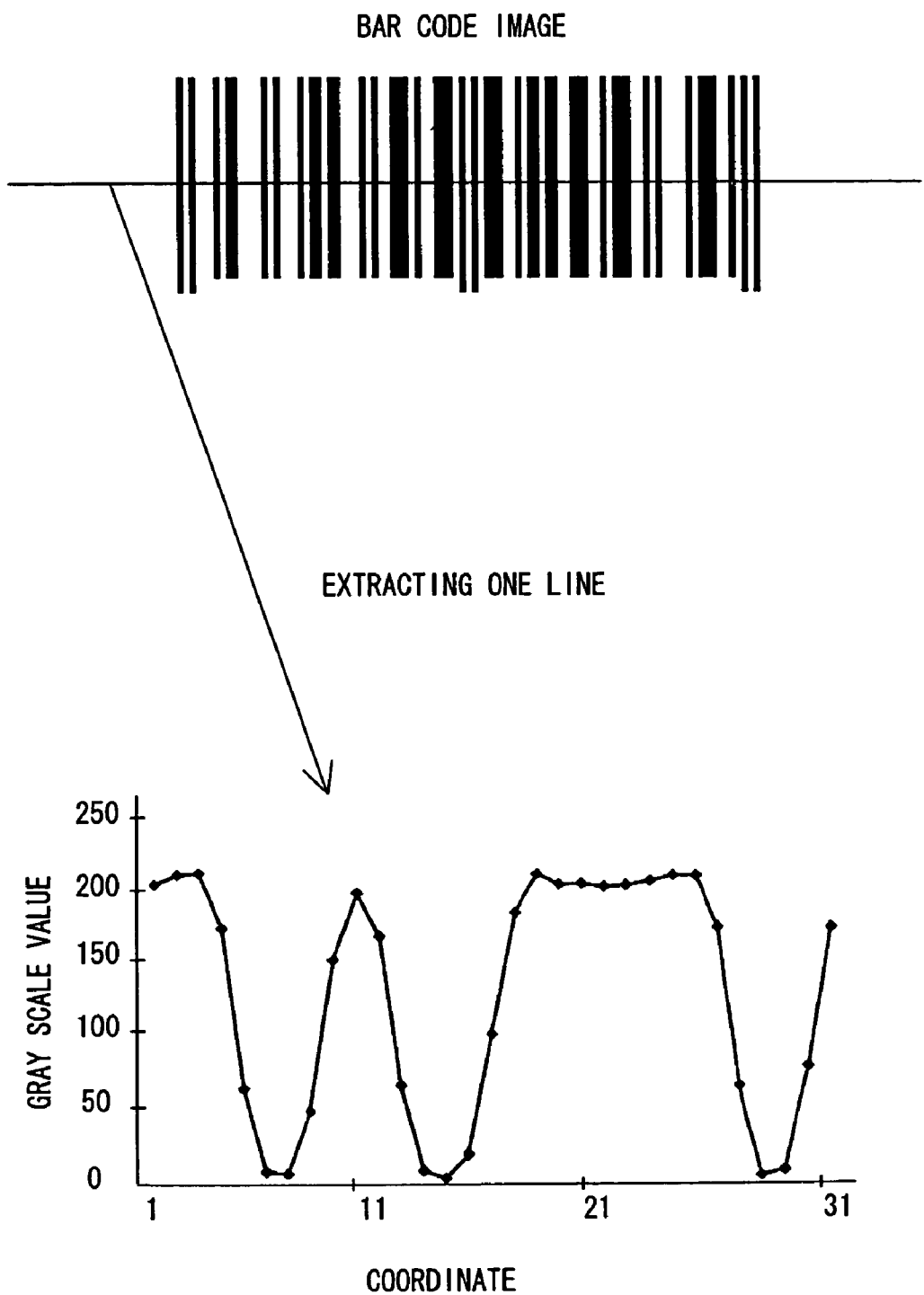
FIG. 4 shows a line of image data of a single hierarchical level element extracted from a bar code image.

FIG. 4 shows an example of image data of a single gray scale element. FIG. 4 shows, for example, a gray scale value indicating white (about 200) for the leftmost portion corresponding to the left margin of a line of image data followed by the portions of low, high, and low gray scale values respectively indicating black of a left guard bar, white, and black, further followed by the gray scale values corresponding to thick white and thin black. The horizontal axis in FIG. 4 indicates the coordinates of pixels.

After performing the gray scale converting process in step S12, or if the image is not a multi-valued image, then the process in step S13 is immediately performed. In step S13, the process of geometrically enlarging and complementing an input image is performed as a complementing process. For example, when a camera of a mobile phone is used, the data size required in decoding data may not be satisfied because of the low read resolution of optical equipment. When the read resolution of optical equipment is low relative to the width of a module corresponding to the line of a width of the smallest unit forming a black bar or a white bar of a bar code, it is impossible to correctly determine whether the module indicates black or white because of the deficiency of the image data per module.

For example, in a bar code in which the width of one module is 0.26 mm, the number of modules is about 98 an inch. If the bar code is read by the optical equipment having the read resolution of 150 dpi, then the number of pixels corresponding to one module in an image is about 1.5, and the number of pixels is insufficient for determination of the value of the module (black or white). In this case, it is necessary to complement the deficiency of the pixels by performing a complementing process. As a method of performing a complementing process, an arbitrary complementing system such as linear complementing, spline complementing, etc. can be used.

If the complementing process in step S13 is completed, and the preprocess on the data is completed for the decoding process, then a bar code image is divided into character information units in the present embodiment. This process is performed in steps S14 through S17 shown in FIG. 3, and the process of dividing the image into character information units and then obtaining the threshold for use in determining the value of each module is first performed in step S14.

Figure 5:
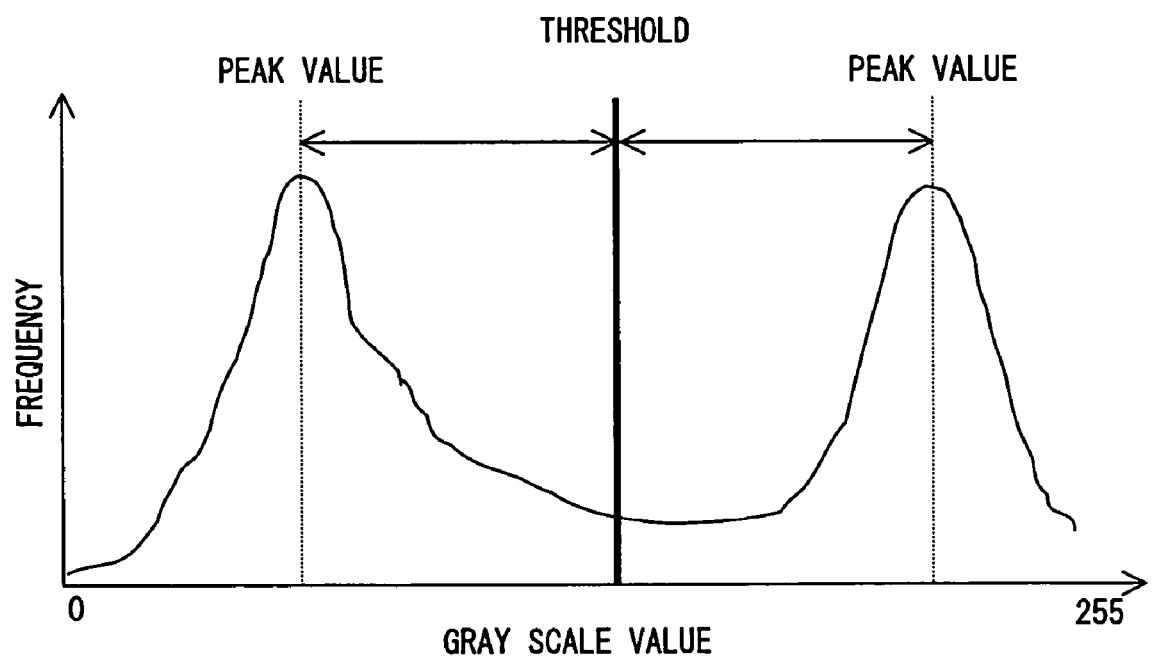
FIG. 5 shows the first method of determining a threshold of a gray scale value of image data.
Figure 6:
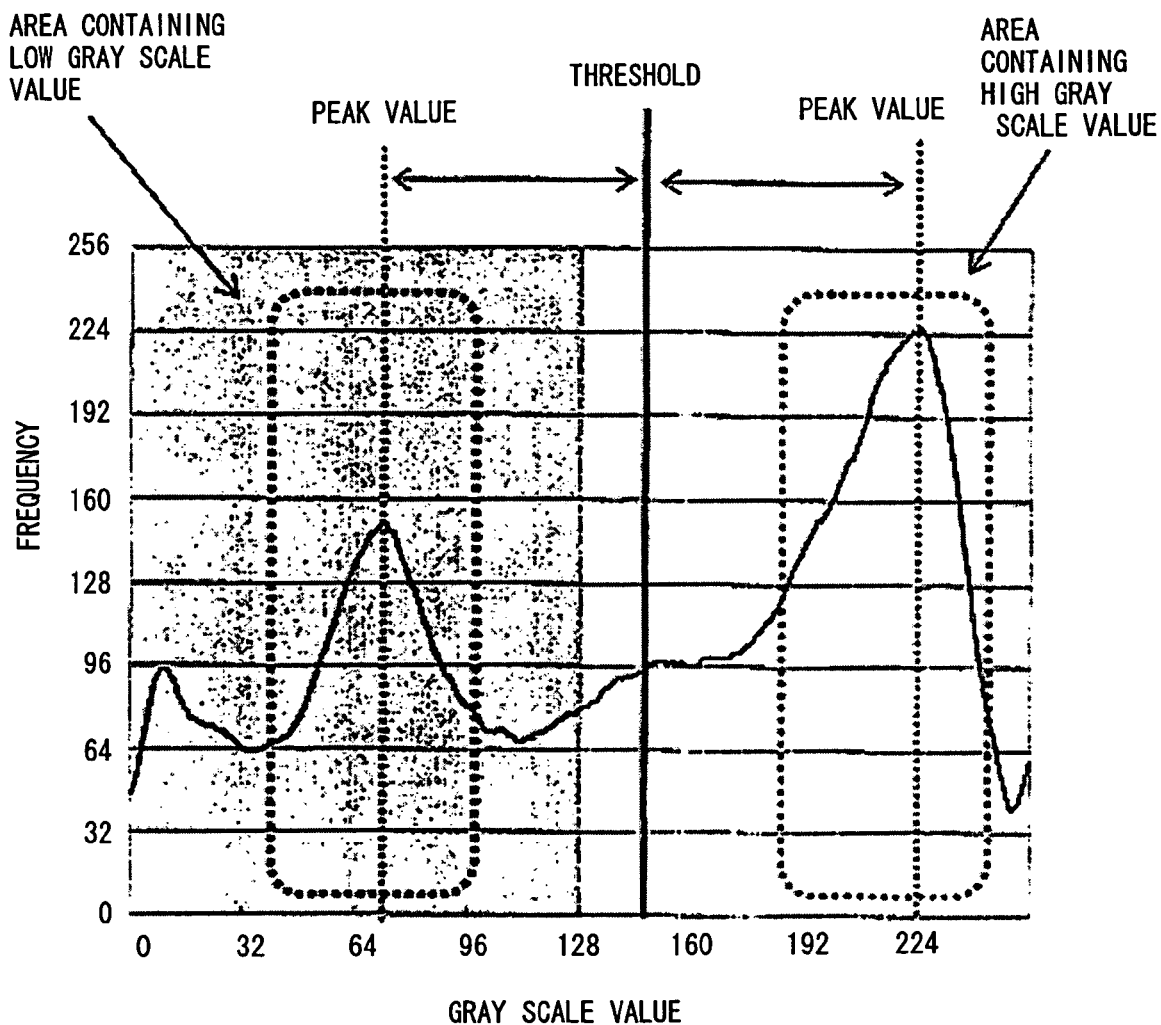
FIG. 6 shows the second method of determining a threshold of a gray scale value of image data.

FIGS. 5 and 6 are explanatory views of a threshold determining method. In the threshold determining process, a threshold is obtained using single gray scale data as a result of the gray scale converting process in step S12 shown in FIG. 3. As described above, the Y element as a result of the YCbCr conversion, that is, the gray scale value of the brightness element, is represented by 256 levels in the present embodiment, and the frequency distribution of the gray scale values corresponding to, for example, the respective pixels of an input image is generated, thereby obtaining a threshold.

In FIG. 5, the frequency distribution includes two peaks. Since the bar code is formed by black bars and white bars, there are basically two peaks, that is, the peak value corresponding to white having high brightness and the peak value corresponding to black having low brightness. When there are only two peaks in the frequency distribution, then a median of the gray scale values corresponding to the two peaks is obtained as a threshold. When there are three or more peaks in the frequency distribution, a median of the gray scale values respectively corresponding to the peak in the position of the highest gray scale value and the peak in the position of the lowest gray scale value can be obtained as a threshold.

FIG. 6 shows another method of determining a threshold. There can be three or more peaks in the frequency distribution of gray scale values due to an unclear bar code or the influence of the function of adjusting the focus of the lens. In this case, using the median of 128 between the highest gray scale value of 255 and the lowest gray scale value of 0, the area is divided into a high gray scale value area and a low gray scale value area, the highest peaks in the peaks occurring in the respective areas are carefully checked, and a threshold is obtained as a median of the gray scale values corresponding to the respective peaks.

Using the above-mentioned threshold determining method, as compared with the case in which simply the median of 128 of the gray scale values 0 to 255 is used as a threshold, a module value described later can be more correctly determined eventhough the printing paper for a bar code is not white or the black bars of the bar code are not clear.

Then, in step S15 shown in FIG. 3, the number of bars, that is, a total number of black bars and white bars, is detected. As shown in FIG. 4, the brightness value as the gray scale value is large for the white bar in the bar code, and it is small for the black bar. In the curve of the gray scale values for the horizontal axis corresponding to the coordinates of the pixels, there occurs an inflection point at the boundary between the black bar and the white bar. According to the present embodiment, a total number of black bars and white bars is obtained by obtaining the number of inflection points.

Figure 7:
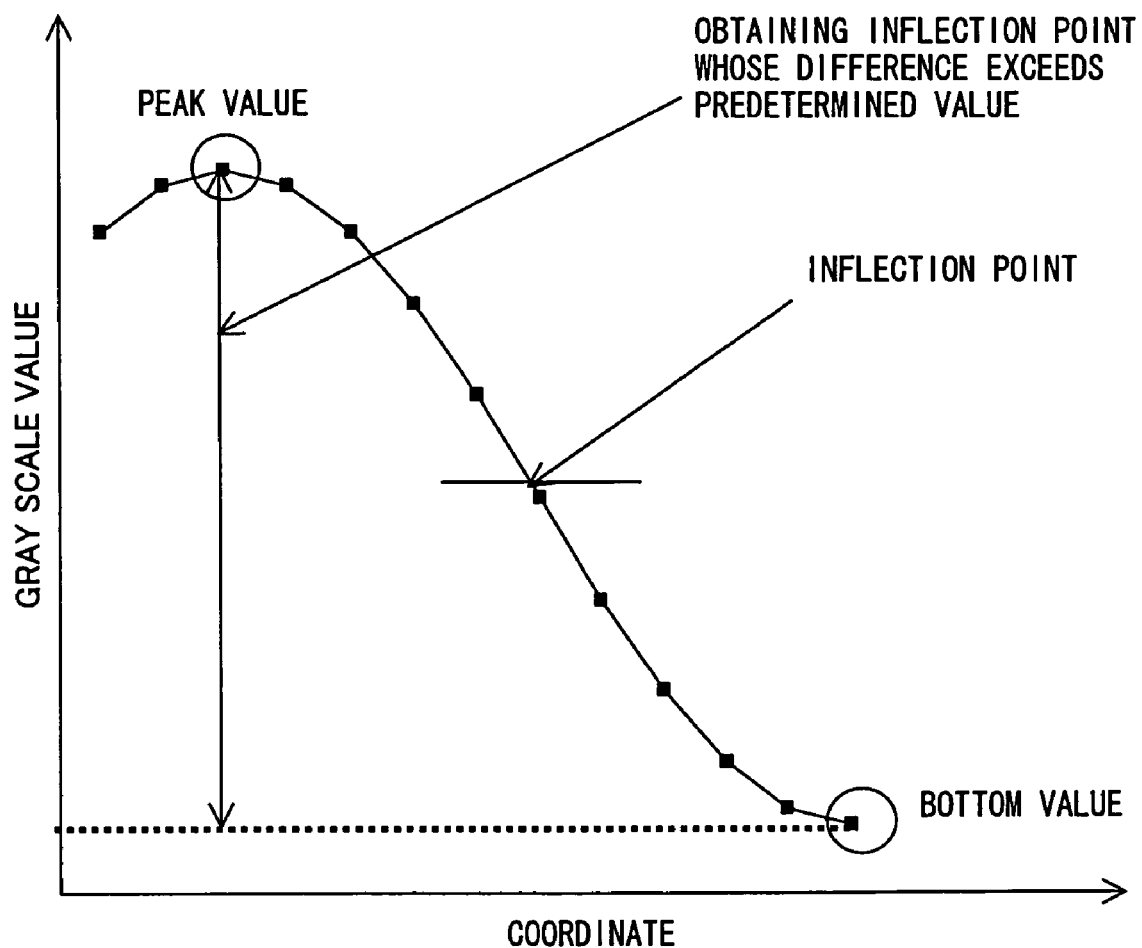
FIG. 7 is an explanatory view (1) of the method of extracting an inflection point.
Figure 8:
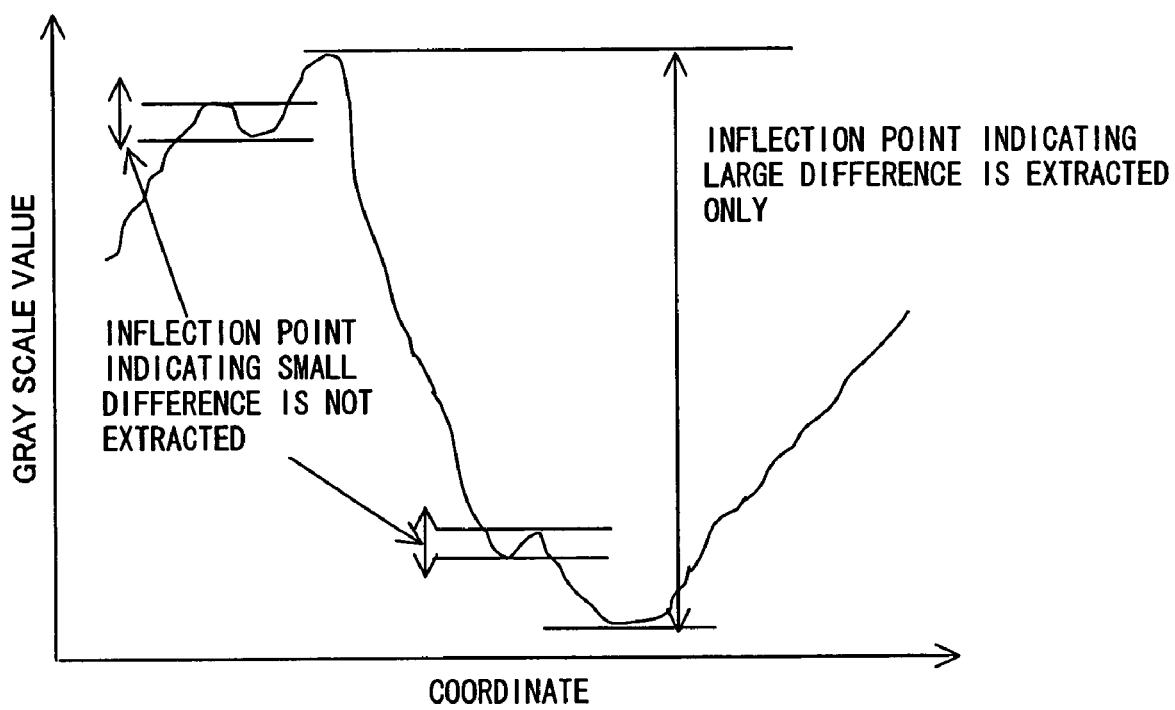
FIG. 8 is an explanatory view (2) of the method of extracting an inflection point.

FIGS. 7 and 8 show the method of extracting the inflection point. In FIG. 7, when a difference between the peak value and the bottom value exceeds a predetermined value in a line of image data, a median inflection point is obtained, and the total number of black bars and white bars is determined from the total number of inflection points.

FIG. 8 is an explanatory view of the method of extracting an inflection point. In FIG. 8, when the difference between a peak value and a bottom value is small, the inflection point between them is not extracted. Assuming that the peak value is MAX and the bottom value is MIN, a determination value is set, and the number of inflection points are obtained when the following inequality is satisfied. Thus, the number of bars can be correctly obtained from an image containing much noise.

determination value<MAX−MIN

In step S16 shown in FIG. 3, the number of pieces of character information contained in the bar code is detected. The detection of the number of pieces of character information is performed by comparing the total number of black bars and white bars obtained in step S15 and the number of inflection points to be contained in each bar code.

For example, in the standard version of a JAN (Japan Article Number) code as a distribution uniform symbol in Japan, 13-digit numbers are stored, and 8-digit numbers are stored in the short version. In the standard version, the number of pieces of character information (number) depending on the combination of a black bar and a white bar in the standard version is 12, and the remaining piece is determined by the combination of the odd parity and the even parity of the six numbers to the left of the center bar in the center of the bar code. The JAN code and other bar codes are described in detail in the following non-patent literature.

J. Hiramoto ("Required Knowledge of Bar Code and Two-dimensional Code"

published by Japan Industrial Publishing Co. LTD (1991)

In the JAN code, a number is represented by two black bars and two white bars, and a center bar is represented by two black bars and three white bars. Additionally, there are a left guard bar which is the leftmost bar in the bar code, and to the right of which number code is stored, and a right guard bar which is the rightmost bar in the bar code, and to the left of which number code is stored. Each of these bars is represented by two black bars and one white bar.

Thus, there are a total of 60 inflection points in a 13-digit bar code of the standard version. In an 8-digit bar code in the short version, there are 44 inflection points. If there are 60 inflection points corresponding to the total number of black bars and white bars detected in step S15, a 13-digit JAN code is represented. If there are 40, an 8-digit JAN code is represented.

In an ITF (interleaved two-of-five) code, a CODE 39, an NW-7, and a CODE 128, the number of characters stored by the bar code is 6, and the number of inflection points is respectively 38, 80, 64, and 28. For example, the number of stored characters can be obtained depending on which number of the inflection points, 38, 80, 64, or 28, the number of the inflection points obtained in step S15 is closer to.

Then, in step S17 shown in FIG. 3, the bar code area is divided into character information units. As described above, the bar code is divided into left and right areas on either side of the center bar. For example, in the JAN code, 6 digits are stored between the left guard bar and the center bar, and 6 digits between the center bar and the right guard bar. The storage area of each number (character) is divided by the above-mentioned inflection point. As compared with the case in which a bar code area is simply divided by the number of characters, the boundary of a character area can be more correctly obtained although distortion occurs on an image.

In the JAN code, the area to the left of the center bar alternately contains a white bar, a black bar, a white bar, and a black bar. Depending on the number of white and black bars in a module, the character corresponding to the area is determined. Therefore, between the left guard bar and the center bar, the rising inflection point is used as a boundary in the starting position and the terminating position of a character (number) area.

On the other hand, between the center bar and the right guard bar, each character is represented by a black bar, a white bar, a black bar, and a white in this order, and the starting position and the terminating position of one character area is divided by a falling inflection point as a boundary.

Figure 9:
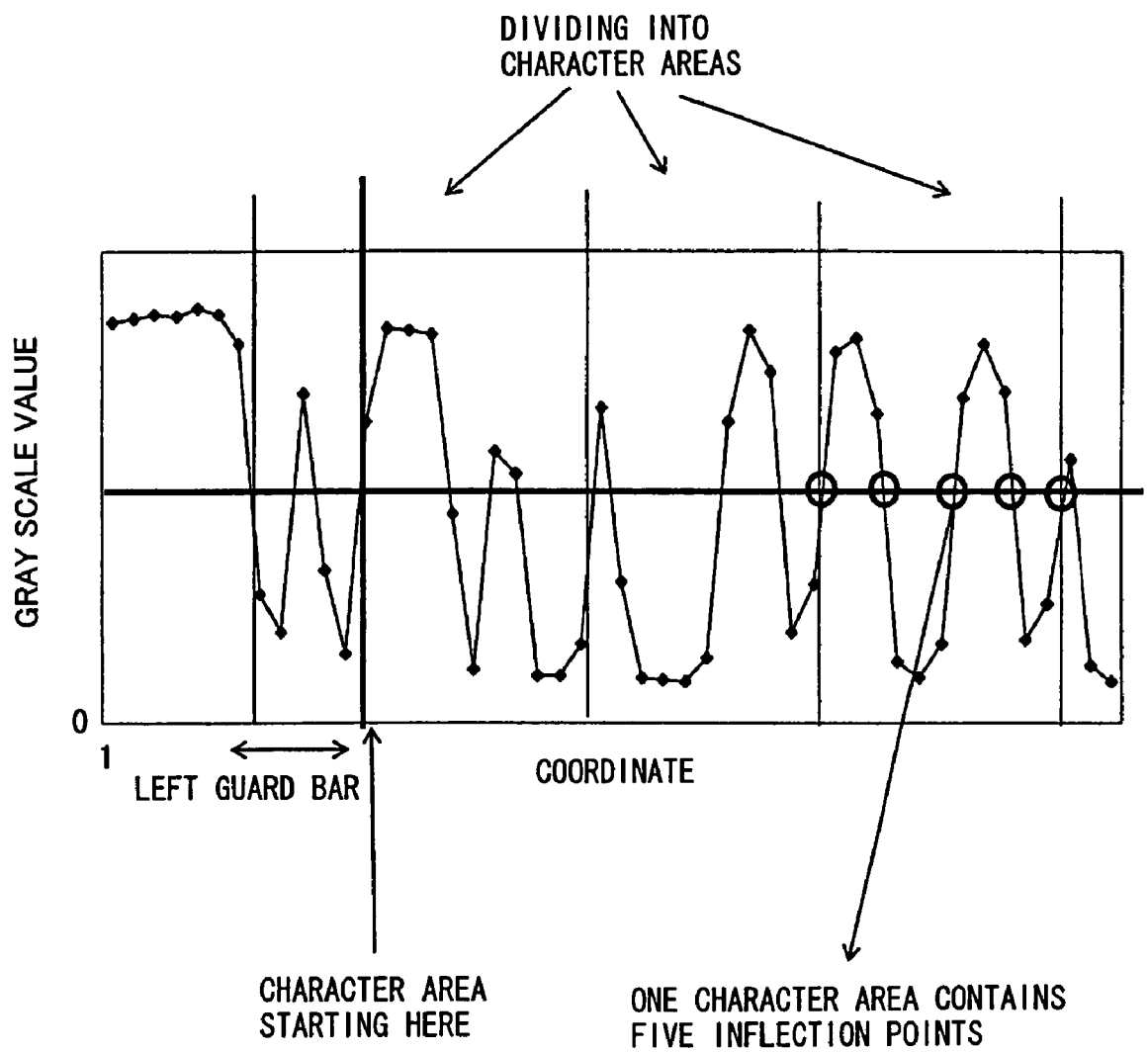
FIG. 9 is an explanatory view of dividing a bar code area into character units.

FIG. 9 is an explanatory view showing an example of dividing the character area. FIG. 9 shows a result of dividing an area to the right of the left guard bar, that is, the area between the left guard bar and the center bar, in a character unit. A character area starts on the right of the left guard bar, that is, two black bars and one white bar. The starting position and the terminating position of the character area of the first character are represented by the respective rising inflection points.

Including the boundary, one character area contains five inflection points. Therefore, the first inflection point through the fourth inflection point are contained in a character area. That is, in the JAN code, the area between the left guard bar and the center bar, and the area between the center bar and the right guard bar can be sectioned by four inflection points into character area units.

In the other codes, for example, in the ITF code, one character area is represented by five black bars or white bars. In the CODE 3Q, it is represented by five black bars and four white bars. In the NW-7, it is represented by four black bars and three white bars. In the CODE-128, it is represented by three black bars and three white bars. With the above-mentioned representation taken into account, a character area can be divided into the respective character units.

If a bar code area is divided into character area units in step S17, the areas divided into character units are further divided into module units, the value of a module, that is, black or white, is determined, and a character represented by each character area is obtained using the value, that is, the conversion into character information is performed.

First, in step S18, the number of modules contained in a bar code is detected. The number of modules forming an area of character units is determined by the type of code. For example, in the JAN code, one character is formed by seven modules. In the CODE-128, it is formed by 11 modules. In step S15, the total number of black bars and white bars is detected based on the number of the inflection points in step S15, and the type of bar code is determined based on the result. Therefore, actually the number of modules in one character unit area is determined at that time.

Figure 10:
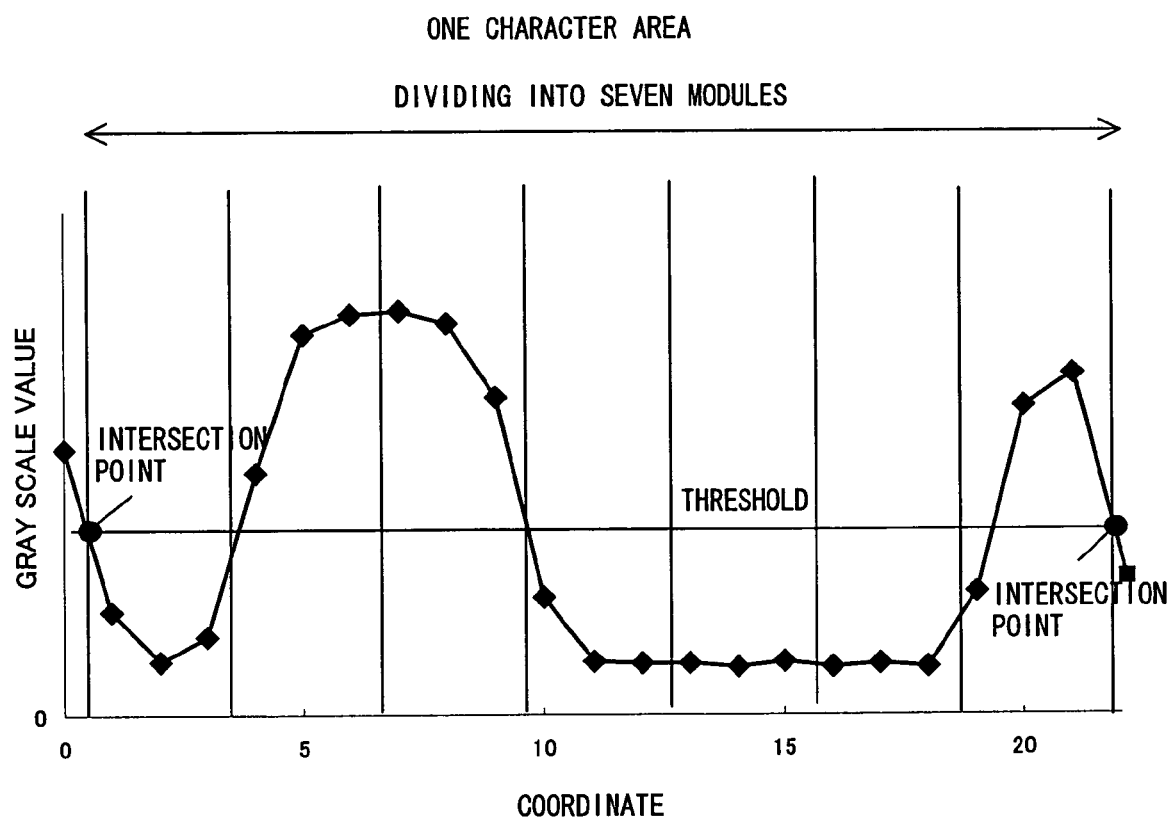
FIG. 10 is an explanatory view of dividing a character area into module units.

In step S19 shown in FIG. 3, each character area is divided into module units. For example, in the JAN code, one character area is divided into seven areas. FIG. 10 is an explanatory view of an example of division. In FIG. 10, unlike the case shown in FIG. 9, one character area is obtained by an intersection point of a curve of a hierarchical value and the above-mentioned threshold. Thus, by defining the intersection point of the threshold as a boundary of a character area, the character area can be divided although it is hard to obtain a correct inflection point because of much noise in the image data.

In FIG. 10, the horizontal axis indicates the coordinates of an image. The black diamond indicates a gray scale value corresponding to each pixel. Three pixels are contained in each module obtained by dividing a character area into seven portions.

Figure 11:
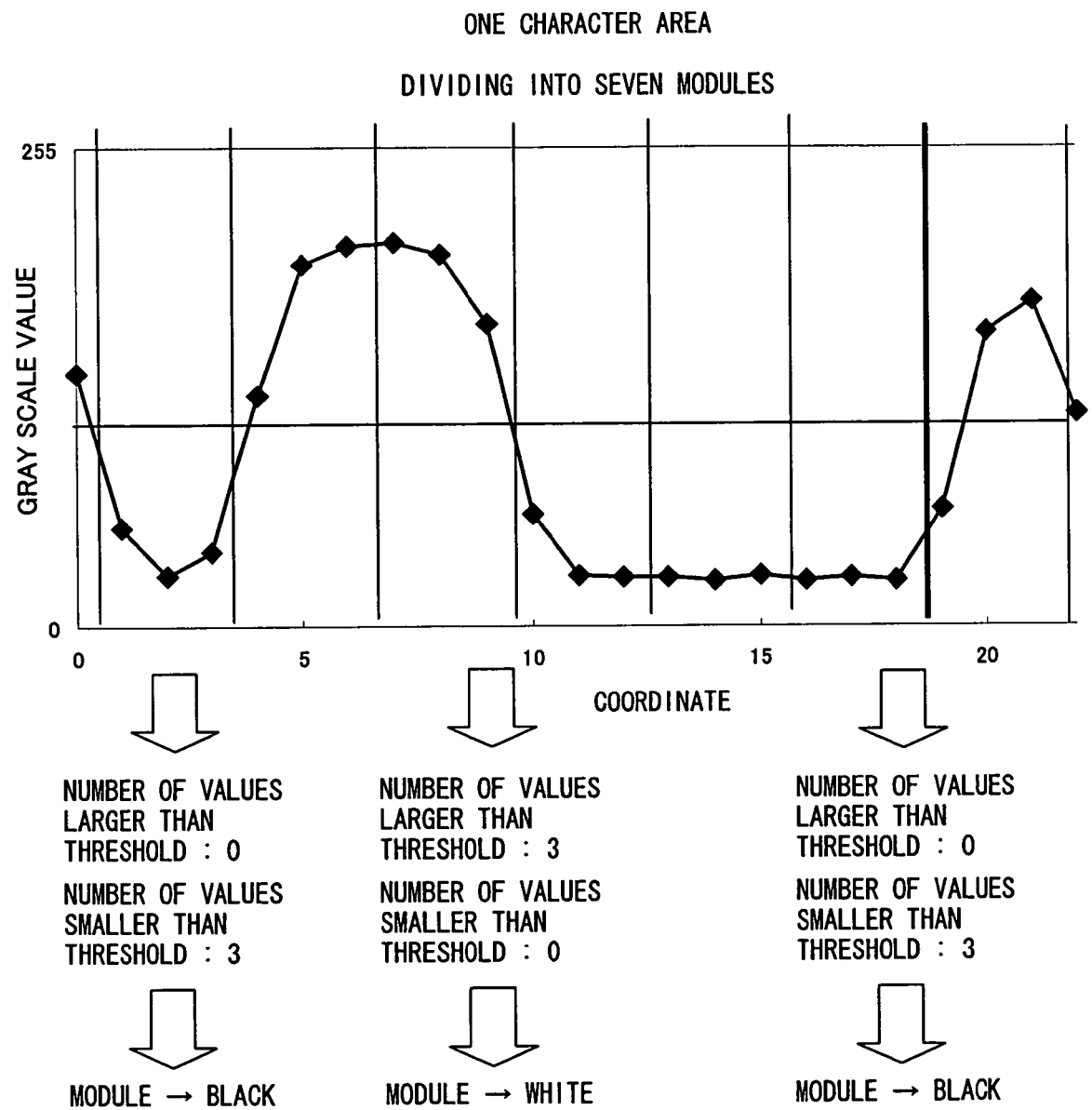
FIG. 11 is an explanatory view of the first method of determining a module value.
Figure 12:
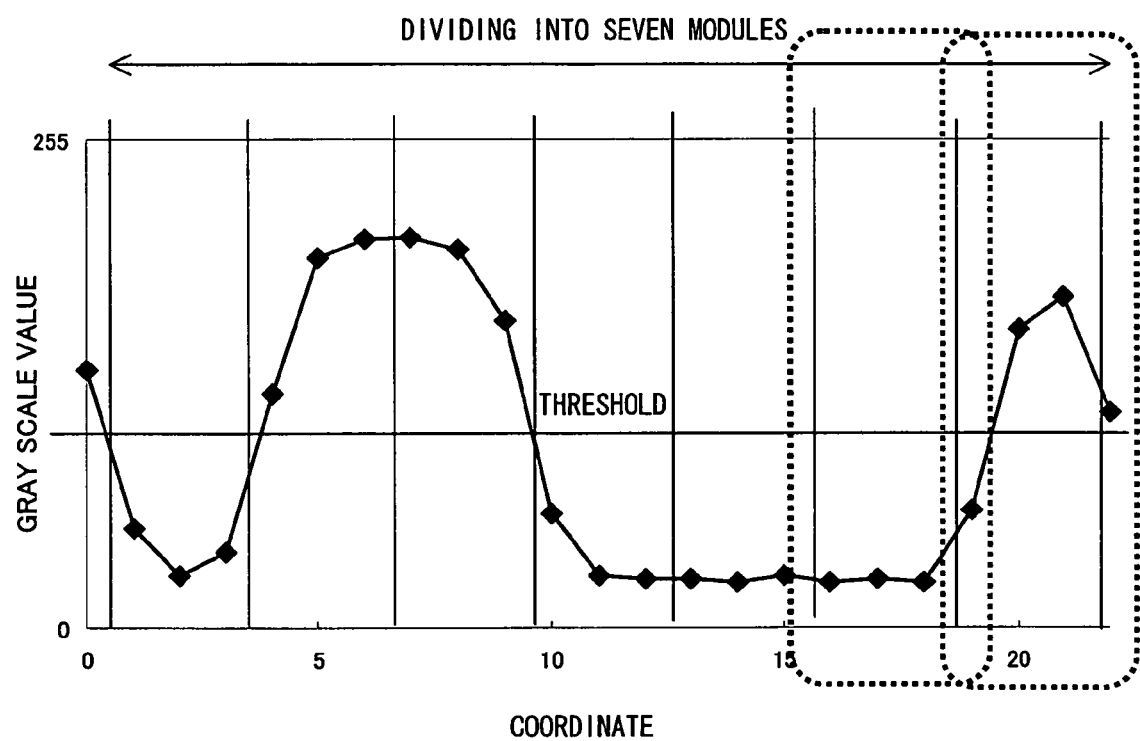
FIG. 12 is an explanatory view (1) of the second method of determining a module value.
Figure 13:
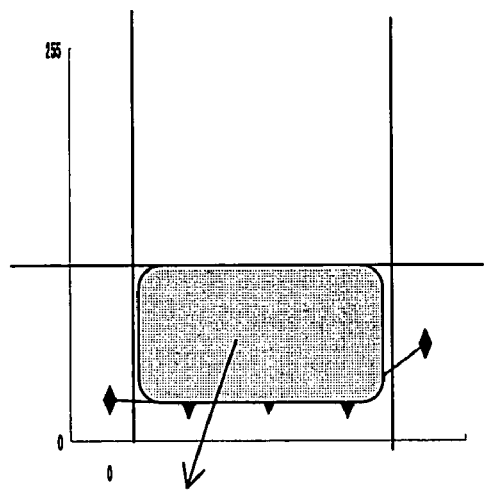
FIG. 13 is an explanatory view (2) of the second method of determining a module value.
Figure 13:
Figure 13:
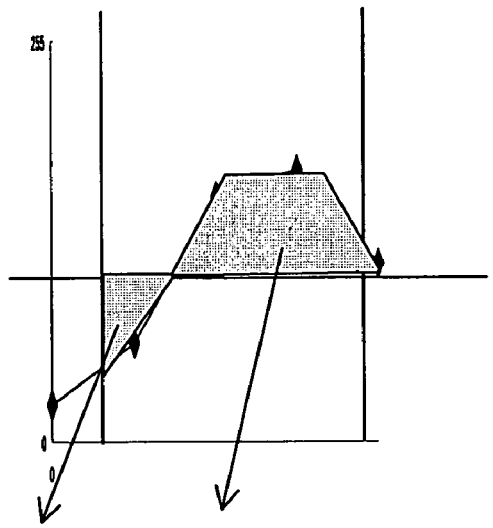
Figure 13:

Then, in step S20 shown in FIG. 3, the value of a module, that is, black or white, is determined. FIGS. 11 through 13 are explanatory views of the determining methods. FIG. 11 is an explanatory view of the first determining method. It is checked whether or not the gray scale value corresponding to each pixel in each module is larger than a threshold. The number of pixels larger than the threshold is compared with the number of pixels smaller than the threshold, thereby determining the value of the grid.

That is, in FIG. 11, the gray scale values of the three pixels forming the first module are lower than the threshold, and the module is determined to be black. The gray scale values of the three pixels forming the third module are higher than the threshold, and the module is determined to be white. The gray scale values of the three pixels forming the sixth module are lower than the threshold, and the module is determined to be black. In FIG. 11, it is assumed that the boundary of one character area is determined based on the inflection point, not on the intersection point of the threshold.

As described above, the number of pixels having a gray scale value higher than the threshold and the number of pixels having a gray scale value lower than the threshold are obtained, and they are compared with each other to determine a module value, thereby correctly determining the module eventhough the image is distorted and the area of the module is somewhat displaced.

FIGS. 12 and 13 shows the second method for determining the value of a module. Like FIG. 11, FIG. 12 shows the relationship between the curve of gray scale value and the threshold. FIG. 13 shows the method for determining the values of the rightmost module (seventh module) of the seven modules, and the preceding module, that is, the sixth module.

In the second method, the area in which the curve of the gray scale value is above the threshold is compared with the area in which the curve of the gray scale value is below the threshold, and the value of the module is determined depending on which is larger. In FIG. 13, (a) indicates the area of 0 above the threshold for the sixth module. It is obvious that the area below the threshold is larger, and it is determined that the value of the module is black. On the other hand, (b) indicates the seventh module, and it is determined that the area above the threshold is larger than the area below the threshold. As a result, the value of the module is determined to be white.

Thus, by determining the module value by comparing the areas above and below the threshold, the value of the module can be correctly determined eventhough the rise and fall of a waveform are moderate, and the focus of the image has been unsuccessfully adjusted.

In the explanation above, a threshold is obtained using the frequency distribution of the entire line of image data, and the value of a module is determined based on the value. The value of the module can also be determined by obtaining and using the threshold for each pattern forming a character. This method is effective when the brightness of a character area is not certain by the influence of incoming light.

When the value of a module is determined, the pattern of the module is converted into character information in step S21 shown in FIG. 3, thereby terminating the process. It is obvious that the conversion into the character information is performed in accordance with the rules of each bar code.

Other embodiments of the decoding apparatus for bar code recognition according to the present invention are further described below by referring to FIGS. 14 through 16.

To recognize a bar code, the decoding process can be performed on a line of image data which is normal to the bar. If a medium is provided with a sheet of paper on which a bar code to be read is printed, for example, a reader contacts merchandise, then the recognizing process can be performed by receiving one line of image data.

When a scanner is used as optical equipment for inputting a bar code image, a target bar code is scanned and a bar code image is input to recognize the bar code. Furthermore, when an image is input with a PDA, etc., it has been necessary for the PDA to issue an instruction to read, etc. data to the scanner.

Figure 14:
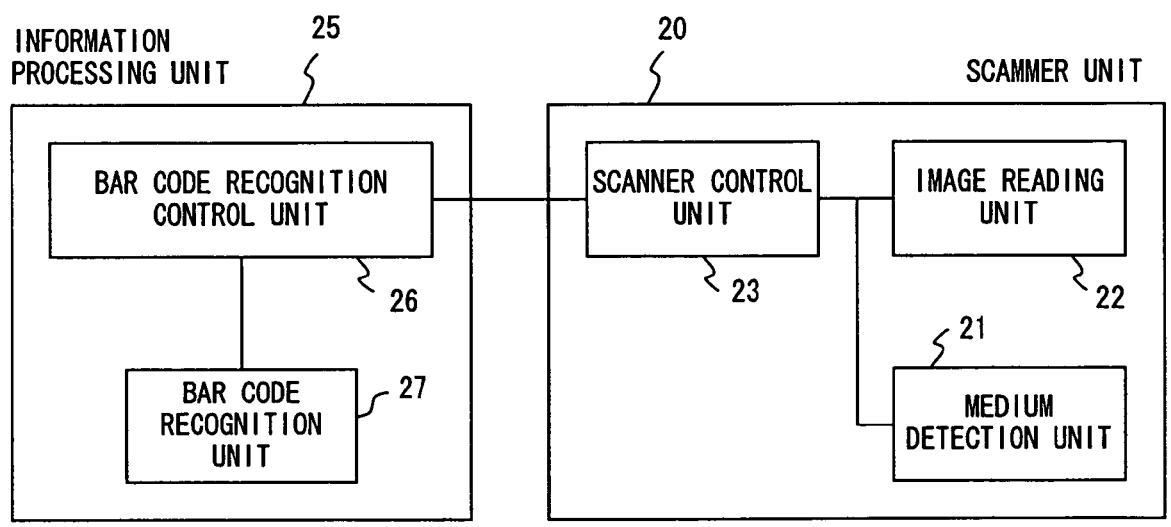
FIG. 14 is a block diagram showing the configuration of another embodiment of the bar code recognition apparatus.

In the embodiment shown in FIG. 14, an image reading device, for example, a scanner is provided with a medium detection unit. When a medium is detected, the process of obtaining and recognizing a line of image data is repeated until the recognition is successfully performed, thereby automatically starting and terminating the necessary operations for bar code recognition and improving the operability.

Using an optical reflective photosensor (photointerrupter) containing inside the package a photo receiving device and a photo emitting device as a medium detection unit, a medium can be detected as a non-contact system.

In FIG. 14, a bar code recognition apparatus is configured by a scanner unit 20 corresponding to the optical equipment 10 shown in FIG. 2 and an information processing unit 25 corresponding to the decoding unit 15. The scanner unit 20 comprises the medium detection unit 21, an image reading unit 22, and a scanner control unit 23, and the information processing unit 25 comprises a bar code recognition control unit 26 and a bar code recognition unit 27.

Figure 15:
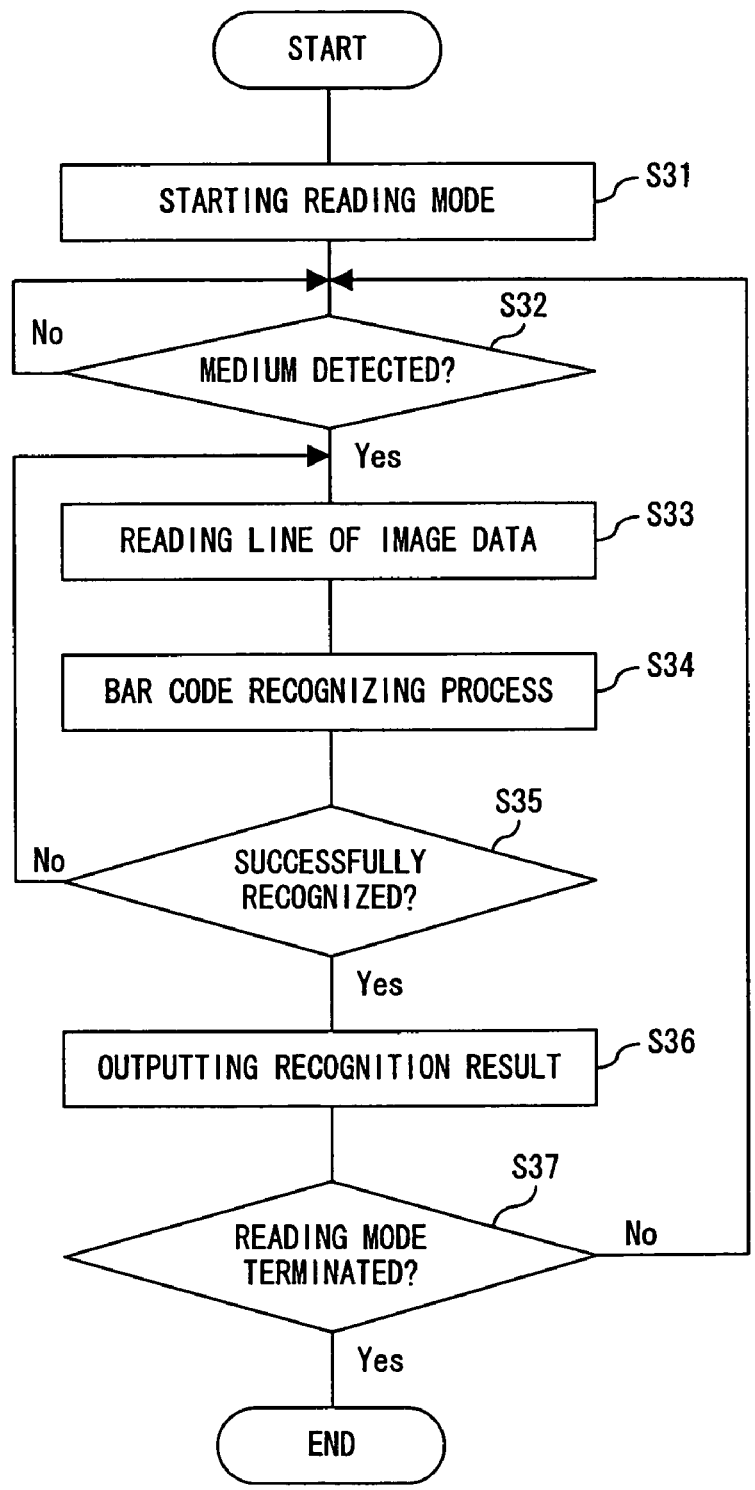
FIG. 15 is a flowchart of a bar code decoding process according to the embodiment as shown in FIG. 14.

FIG. 15 is a flowchart of the process performed by the bar code recognition apparatus shown in FIG. 14. When the process is started as shown in FIG. 15, first in step S31, the reading mode is started at an instruction to read an image from the PDA to the scanner. In step S32, the medium detection unit 21 determines whether or not a mechanical sensor for contact detection has detected the contact with a medium. If it has not been detected, the determination continues.

If a medium has been detected, a line of image data is read by the image reading unit 22 in step S33. In the image reading process, when the medium detection unit 21 detects the contact with the medium, the result is transmitted to the bar code recognition control unit 26 inside the information processing unit 25 through the scanner control unit 23. Then, the bar code recognition control unit 26 instructs the scanner control unit 23 to read a line of image.

The bar code recognition unit 27 recognizes a line of image data in step S34, and it is determined in step S35 whether or not the recognition has been successfully performed. If it is has not been successfully performed, then the processes in and after step S33 are repeated until the recognition can be successfully performed.

If the recognition can be successfully performed, the recognition result is output in step S36. For example, if it is determined that the reading mode has terminated in step S37 in the operation of the PDA, the process terminates. If it is determined that the reading mode has not terminated, then the processes in and after step S32 are repeated. Thus, the bar code recognizing process can be automatically started and terminated from the detection of a medium to the output of a recognition result, thereby improving the operability of the recognition apparatus.

Figure 16:
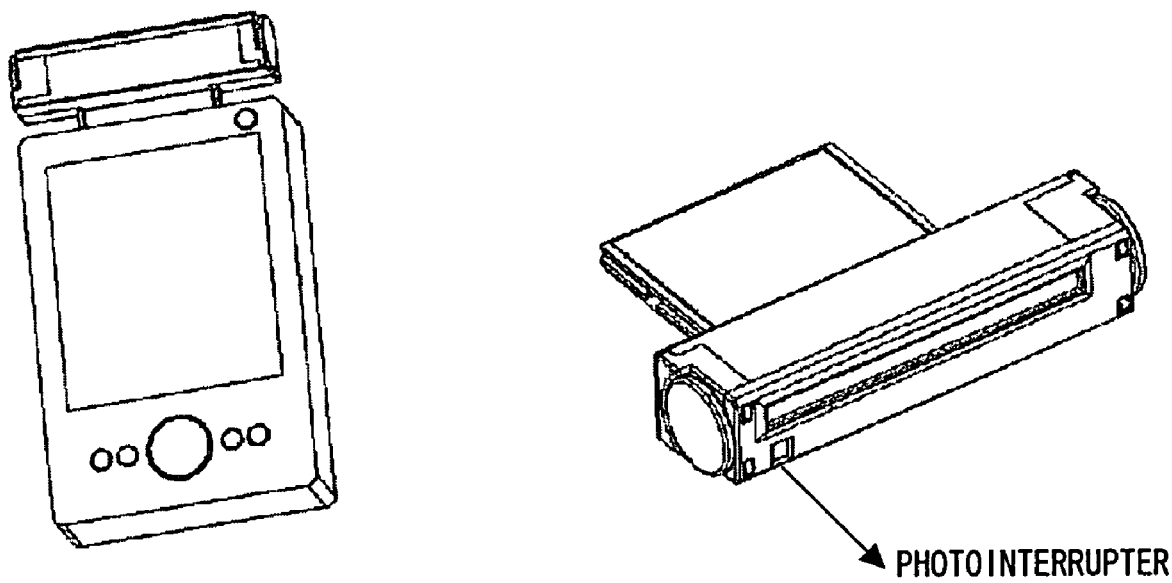
FIG. 16 shows the configuration of the recognition apparatus using a photosensor as a medium detection unit.

FIG. 16 shows the configuration of the recognition apparatus according to the embodiment as viewed from the reading surface of the scanner. A photosensor is mounted onto the reading surface so that a medium can be detected. An operation switch of the on the left PDA is normally arranged below the display unit, and is separated from the folder of the reading device. When an instruction is issued using an operation switch to start or terminate the bar code recognition, it has been necessary to keep the operator's hands off the reading device. However, using a photosensor when a medium is detected, it is not necessary to issue an instruction to start and terminate the reading. Furthermore, a medium can be detected without contact, thereby extending the life of the device as compared with the mechanical switch for detecting the medium with contact.

Figure 17:
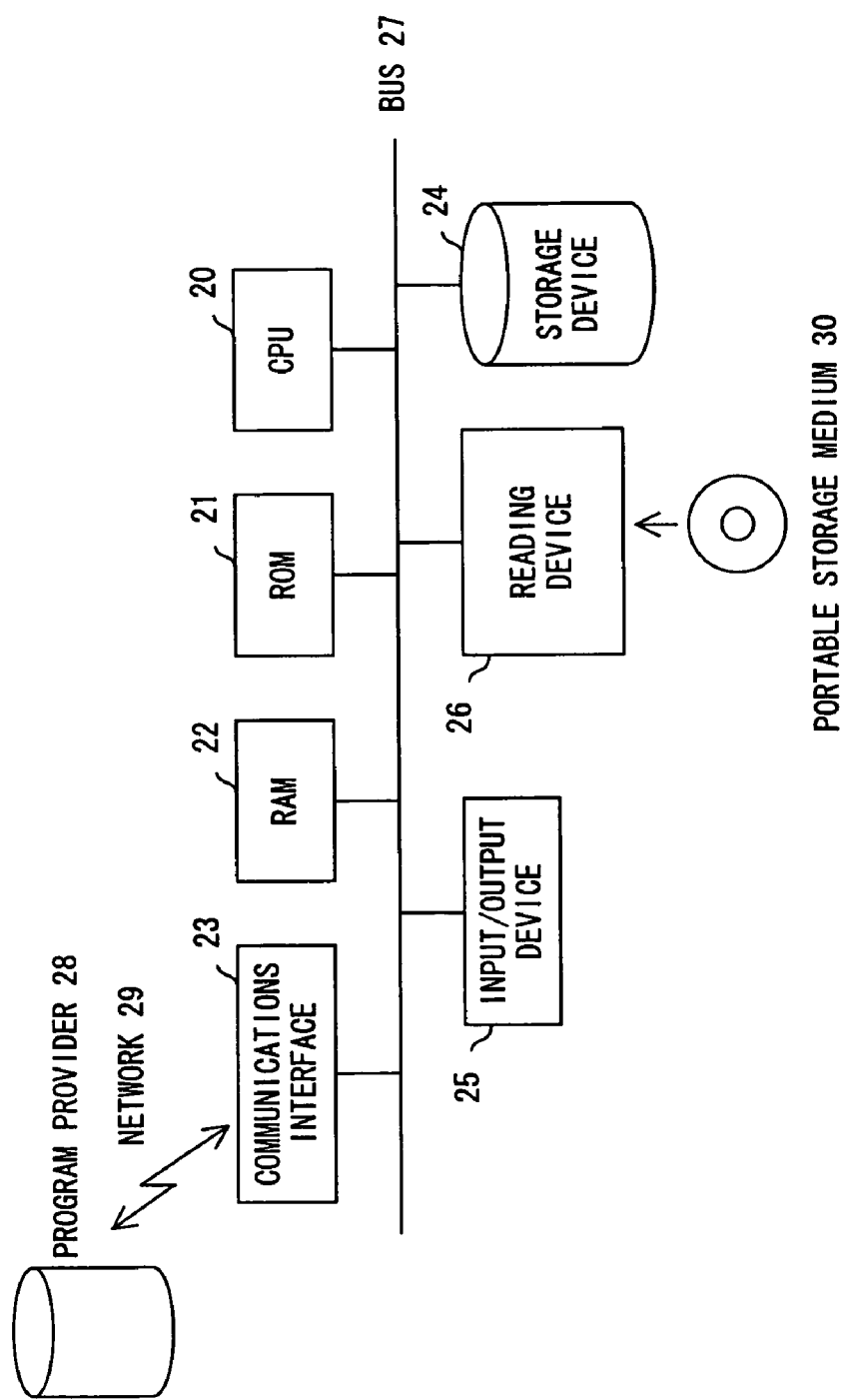
FIG. 17 shows the process of loading a program into a computer according to an embodiment of the present invention.

As described above, the bar code recognizing method and the decoding device according to the present invention have been described in detail. The decoding device can also be configured as a common computer system. FIG. 17 is a block diagram of the configuration of the computer system, that is, a hardware environment.

In FIG. 17, the computer system is configured by a central processing unit (CPU) 30, read-only memory (ROM) 31, random access memory (RAM) 32, a communications interface 33, a storage device 34, an input/output device 35, a portable storage medium reading device 36, and a bus 37 for connection of these units.

As the storage device 34, various storage devices such as a hard disk, a magnetic disk, etc. can be used. The storage device 34 or the ROM 31 stores a program, etc. as shown in the process explanatory view in FIG. 1E and the flowchart in FIG. 3. The program is executed by the CPU 30. Thus, the bar code can be recognized using the general-purpose optical equipment according to the present embodiment.

The above-mentioned program can be stored, for example, in the storage device 34 from a program provider 38 through a network 39 and a communications interface 33, or stored in a portable storage medium 40 marketed and distributed, set in the portable storage medium 36 to be executed by the CPU 30. A portable storage medium 40 can be various storage media such as CD-ROM, a flexible disk, an optical disk, a magneto optical disk, etc. When a program stored in the above-mentioned storage media is read by the portable storage medium 36, and a bar code can be correctly recognized according to the present embodiment.

As described above in detail, using the decoding system according to the present invention, a bar code recognition apparatus can be provided by combining general-purpose optical equipment with a decoding unit such as a PC, a PDA, etc.

In the general-purpose optical equipment, there can occur distortion in input data by the relative position between a bar code and the optical equipment, the function of adjusting the focus of the lens, etc., but the decoding system according to the present invention can realize reading a bar code regardless of the type of optical equipment and without lowering the reading precision.

Furthermore, by providing a medium on which a bar code is printed, for example a medium detection unit for detecting a contact with merchandise for optical equipment, for example, a scanner, reading and recognizing a line of image data can be automatically started and terminated, and the operability and the reliability of the apparatus can be improved using an optical switch as the medium detection unit.

Furthermore, when a dedicated bar code reader is used, the bar code recognizing method according to the present invention can improve the reading precision, thereby remarkably contributing to the improvement of the utility of the bar code recognizing method.

What is claimed is:

1. A bar code recognizing method of reading a bar code using optical equipment, including:
   an image extracting process of extracting a line of image data by scanning a bar code;
   a character area dividing process of detecting an inflection point of a curve indicating a relationship between each pixel of the image data and a gray scale value for the pixel, and dividing the extracted image into a number of character areas corresponding to a total number of the detected inflection points; and
   a pattern converting process of dividing the character area into a predetermined number of module areas, determining a value of each module by comparing a gray scale value of a pixel in each module with a predetermined gray scale value, and converting the divided patterns into characters.

2. The method according to claim 1, further comprising an image data converting process of converting multi-valued image data into gray scale image data having a single color element when the line of image data extracted in the image extracting process is multi-valued image data having a plurality of color elements, and providing resultant data for a character area dividing process.

3. The method according to claim 1, further comprising an image data complementing process of complementing deficient data in the line of image data extracted in the image extracting process and providing resultant data for the character area dividing process.

4. The method according to claim 1, wherein said character area dividing process comprises:
   a bar number detecting process of detecting a total number of black bars and white bars contained in a bar code;
   a character number detecting process of detecting a number of characters contained in a bar code corresponding to a total number of black bars and white bars; and
   a boundary determining process of determining a boundary of the pattern corresponding to the number of detected characters.

5. The method according to claim 4, wherein in said bar number detecting process, a total number of black bars and white bars can be detected corresponding to the number of inflection points in a curve indicating the line of image data.

6. The method according to claim 5, wherein in said bar number detecting process, a number of inflection points for which a difference between a peak value and a bottom value of a curve including the inflection points exceeds a predetermined value is counted in the inflection points.

7. The method according to claim 1, wherein in said character area dividing process, a boundary of a pattern forming the character is obtained from inflection points of a curve indicating the line of image data.

8. The method according to claim 7, wherein in said character area dividing process, a boundary of the pattern is obtained from inflection points for which a difference between a peak value and a bottom value of a curve including the inflection points exceeds a predetermined value in the inflection points.

9. The method according to claim 7, wherein in said character area dividing process, an inflection point indicating a negative tilt when a black bar exists as a leftmost bar in a pattern forming the character, and an inflection point indicating a positive tilt when a white bar exists as a leftmost bar are starting boundaries of the pattern.

10. The method according to claim 7, wherein in said character area dividing process, an inflection point indicating a positive tilt when a black bar exists as a rightmost bar in a pattern forming the character, and an inflection point indicating a negative tilt when a white bar exists as a rightmost bar are terminating boundaries of the pattern.

11. The method according to claim 1, wherein said pattern converting process comprises:
    a module area dividing process of dividing the divided pattern by a number of modules having a width of a smallest unit forming a black bar or a white bar of a bar code;
    a module value determining process of determining as a module value whether the divided module forms a black bar or a white bar; and
    a module data converting process of converting the pattern formed by the module into a character.

12. The method according to claim 11, further comprising a threshold computing process of computing a threshold for determination as to whether the value of the module is black or white, wherein in said module value determining process, data of pixel contained in each of the divided modules is compared with the threshold, thereby determining a value of a module.

13. The method according to claim 12, wherein in said module value determining process, in pixels contained in the module, a number of pixels whose image data is higher than a threshold is compared with a number of pixels whose image data is lower than the threshold, thereby determining a value of a module.

14. The method according to claim 12, wherein in said module value determining process, in an area enclosed by a curve indicating the line of image data and the threshold in the module, an area above the threshold is compared with an area below the threshold, thereby determining a value of a module.

15. The method according to claim 12, wherein in said threshold computing process, frequency distribution of image data is obtained using the line of image data, and an average value between two pieces of data respectively corresponding to a peak in a portion containing a largest data value in the frequency curve and a peak in a portion containing a smallest data value is defined as a threshold.

16. The method according to claim 12, wherein in said threshold computing process, frequency distribution of image data is obtained using the line of image data, and the frequency curve is divided into two areas by a median between a maximum value and a minimum value of the image data, and an average value between two pieces of data respectively corresponding to a largest peak in a large area of image data and a largest peak in a small area of image data is defined as a threshold.

17. The method according to claim 12, wherein in said threshold computing process, the line of image data is divided into the patterns, and the threshold is computed for each pattern.

18. The method according to claim 1, further comprising a threshold computing process of computing a threshold for use in obtaining a boundary of a pattern forming the character using the line of image data, wherein a boundary of the pattern is obtained from intersection points of a curve indicating the line of image data and the computed threshold.

19. The method according to claim 18, wherein in said threshold computing process, frequency distribution of image data is obtained using the line of image data, and an average value between data respectively corresponding to a peak in a portion containing a largest data value and a peak in a portion containing a smallest data value in the frequency curve is defined as a threshold.

20. The method according to claim 18, wherein in said threshold computing process, frequency distribution of image data is obtained using the line of image data, and the frequency curve is divided into two areas by a median between a maximum value and a minimum value of the image data, and an average value between two pieces of data respectively corresponding to a largest peak in a large area of image data and a largest peak in a small area of image data is defined as a threshold.

21. A decoding apparatus for bar code recognition which recognizes bar code data read by optical equipment, comprising:
    an image extraction unit extracting a line of image data by scanning a read result of a bar code by the optical equipment;
    a character area division unit dividing the line of the extracted image into patterns forming character areas responsive to a gray scale inflection point of pixels of the line; and
    a pattern conversion unit converting the divided patterns into characters by dividing the characters areas into module areas, comparing gray scale pixel values of the module areas with a reference gray scale value and converting responsive to the comparing.

22. The apparatus according to claim 21, wherein said optical equipment comprises a medium detection unit for detecting a medium on which a bar code is printed; and
    said image extraction unit extracts the line of image data corresponding to the medium detection result.

23. The apparatus according to claim 22, wherein said medium detection unit is an optical switch for optically detecting a medium.

24. A computer-readable storage medium storing a program used to direct a computer for performing a process of recognizing bar code data read by optical equipment to perform:
    extracting a line of image data by scanning a read result of a bar code by the optical equipment;
    dividing the line of the extracted image into patterns forming characters areas responsive to a gray scale inflection point of pixels of the line; and
    converting the divided patterns into characters by dividing the characters areas into module areas, comparing gray scale pixel values of the module areas with a reference gray scale value and converting responsive to the comparing.

25. A decoding apparatus for bar code recognition which recognizes bar code data read by optical equipment, comprising:

image extraction means for extracting a line of image data by scanning a read result of a bar code by the optical equipment;

character area division means for dividing the line of the extracted image into patterns forming characters areas responsive to a gray scale inflection point of pixels of the line; and pattern conversion means for converting the divided patterns into characters by dividing the characters areas into module areas, comparing gray scale pixel values of the module areas with a reference gray scale value and converting responsive to the comparing.

26. The apparatus according to claim 25, wherein:

said optical equipment comprises medium detection means for detecting a medium on which a bar code is printed; and said image extraction means extracts the line of image data corresponding to the medium detection result.

27. The apparatus according to claim 26, wherein said medium detection means is an optical switch for optically detecting a medium.

* * * * *